(12) United States Patent
Matsui et al.

(10) Patent No.: US 7,213,920 B2
(45) Date of Patent: May 8, 2007

(54) IMAGE DISPLAY APPARATUS

(75) Inventors: Hiroaki Matsui, Tokyo (JP); Tomoya Yano, Kanagawa (JP); Yukio Ohmura, Tokyo (JP)

(73) Assignee: Sony Corporation, Tokyo (JP)

( * ) Notice: Subject to any disclaimer, the term of this patent is extended or adjusted under 35 U.S.C. 154(b) by 66 days.

(21) Appl. No.: 10/536,513

(22) PCT Filed: Nov. 28, 2003

(86) PCT No.: PCT/JP03/15286

§ 371 (c)(1),
(2), (4) Date: May 25, 2005

(87) PCT Pub. No.: WO2004/055589

PCT Pub. Date: Jul. 1, 2004

(65) Prior Publication Data

US 2006/0072074 A1    Apr. 6, 2006

(30) Foreign Application Priority Data

Dec. 13, 2002   (JP) .............................. 2002-363070

(51) Int. Cl.
| | |
|---|---|
| G03B 21/26 | (2006.01) |
| G03B 21/28 | (2006.01) |
| G03B 21/20 | (2006.01) |
| G03B 5/30 | (2006.01) |
| G03B 27/28 | (2006.01) |
| G03B 27/10 | (2006.01) |
| G02F 1/1335 | (2006.01) |
| G02F 1/00 | (2006.01) |
| H04N 5/74 | (2006.01) |
| F21V 7/00 | (2006.01) |

(52) U.S. Cl. ............................ 353/20; 353/37; 353/84; 353/99; 353/102; 349/9; 359/483; 359/623; 348/759; 362/341

(58) Field of Classification Search .................. 353/20, 353/33, 34, 37, 81, 82, 84, 98, 99, 102; 349/5, 349/7–9; 359/483, 619, 621–623; 348/744, 348/759; 362/317, 326, 331, 335, 341
See application file for complete search history.

(56) References Cited

U.S. PATENT DOCUMENTS 5,777,695 A * 7/1998 Yamagishi .................. 348/744

(Continued)

FOREIGN PATENT DOCUMENTS

JP    2002-331837    5/2002

(Continued)

*Primary Examiner*—W. B. Perkey
*Assistant Examiner*—Rochelle Blackman
(74) *Attorney, Agent, or Firm*—Sonnenschein Nath & Rosenthal LLP

(57) ABSTRACT

According to the present invention, there is provided an image display device including a non-luminous reflection type spatial light modulating element, illuminating system to illuminate the reflection type spatial light modulating element and a projection lens and in which light from a light source (2) illuminates the reflection type spatial light modulating elements (14, 15) via first and second fly-eye integrators (9, 10). An unnecessary part, not modulated, of the light reflected by the reflection spatial light modulating elements (14, 15) and further by a reflector (4) for recycling. Since the fly-eye integrators (9, 10) are displaced in relation to their optical axes, it is possible to utilize the light with an improved efficiency and prevent any nonuniform illumination from taking place.

12 Claims, 36 Drawing Sheets

U.S. PATENT DOCUMENTS 6,631,039 B2 * 10/2003 Fujimori et al. ............ 359/819
6,910,772 B2 * 6/2005 Yano ............................ 353/20
2002/0085179 A1 * 7/2002 Lee .............................. 353/84

FOREIGN PATENT DOCUMENTS

JP 2002-328430 11/2002

* cited by examiner

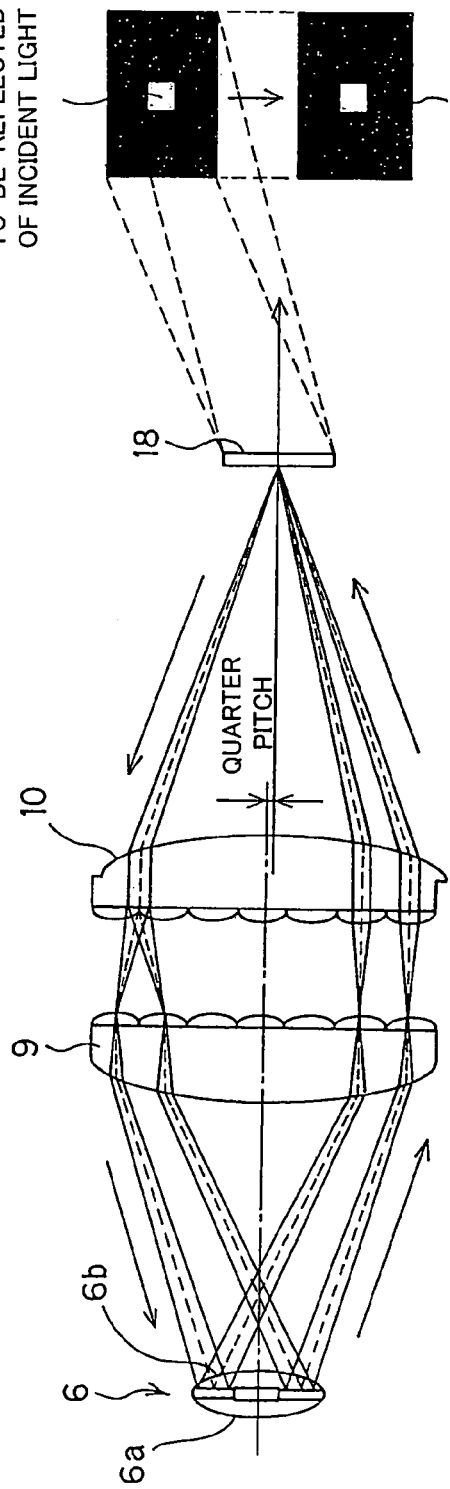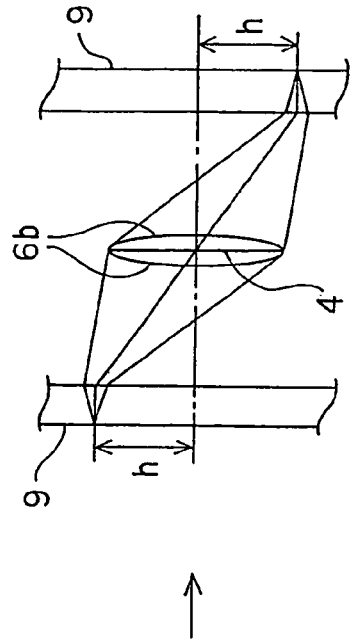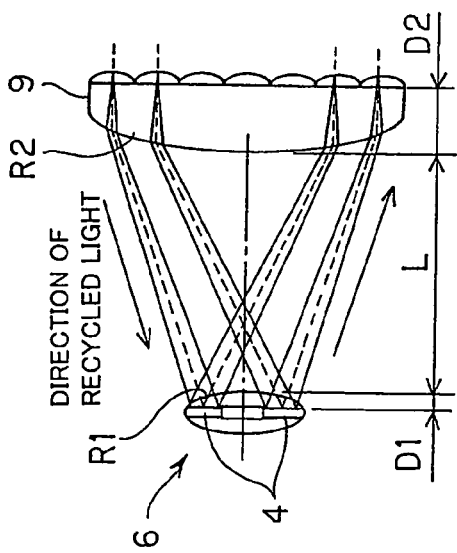
FIG. 34A
FIG. 34B
FIG. 34C

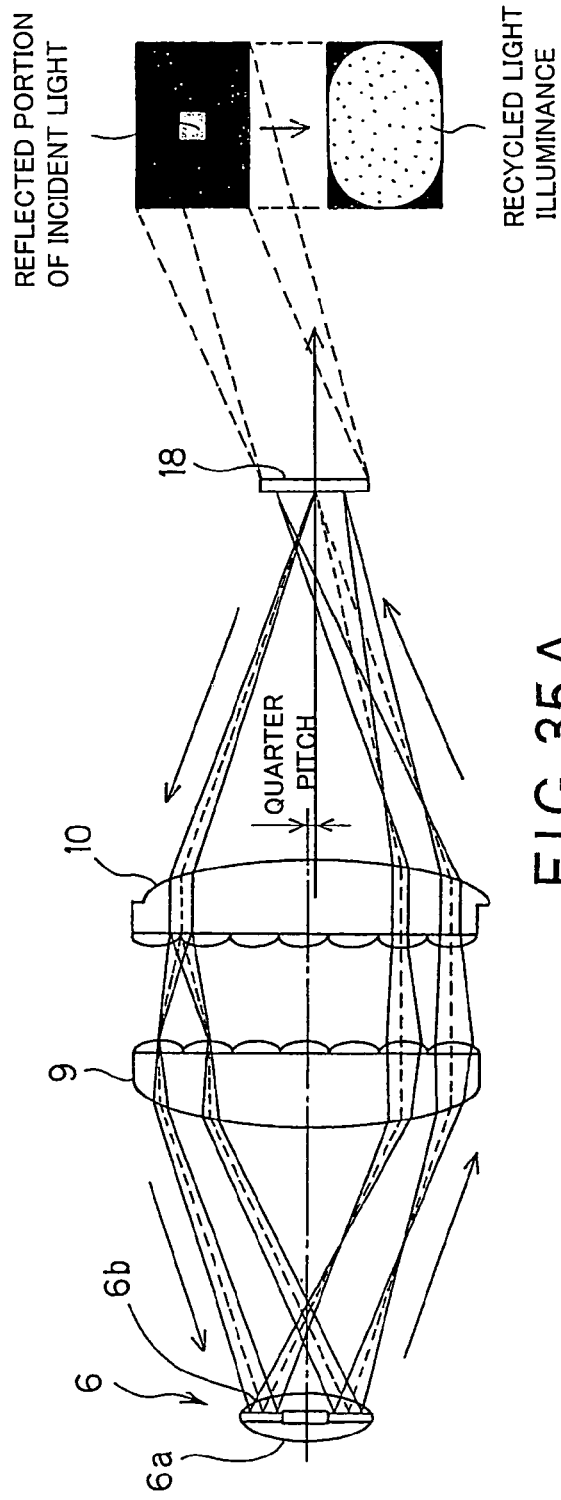
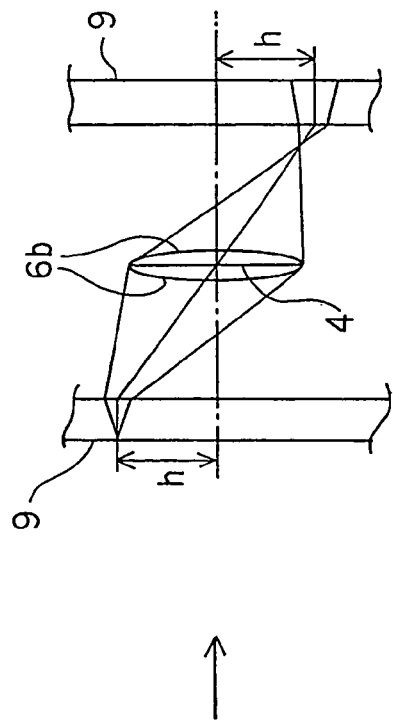
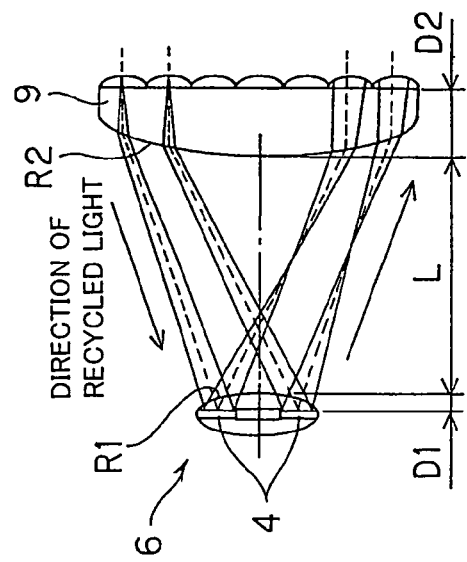
FIG. 35A
FIG. 35C
FIG. 35B

ODD NUMBER OF FLY-EYE LENSES

EVEN NUMBER OF FLY-EYE LENSES

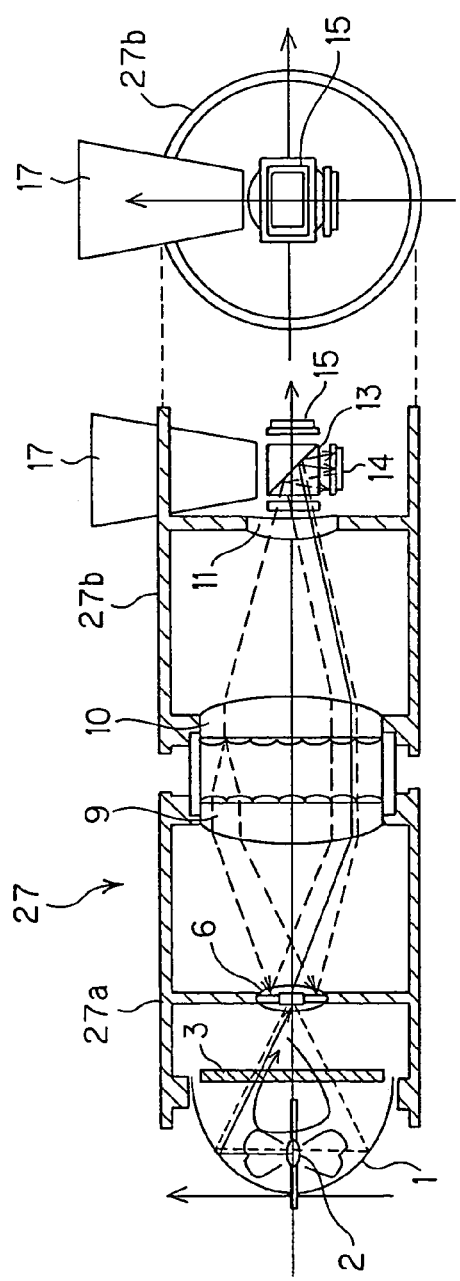
FIG. 55A
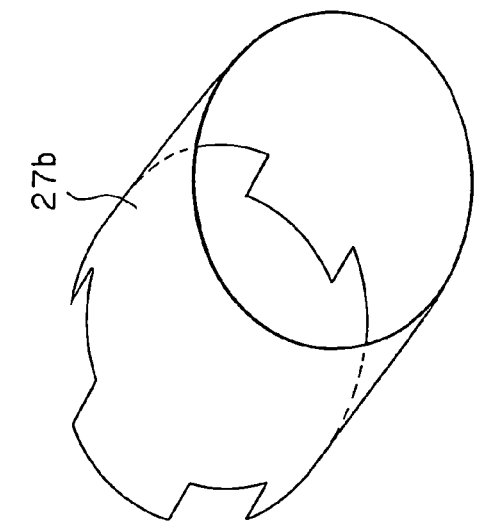
FIG. 55B
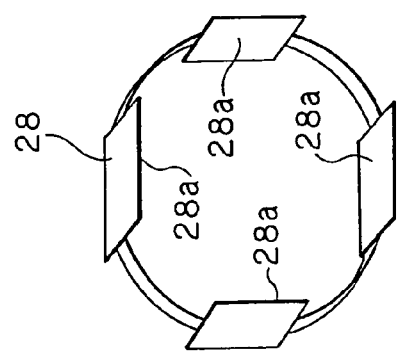
FIG. 55D
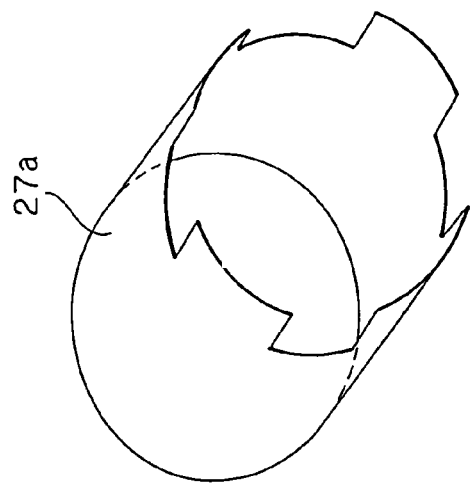
FIG. 55C
FIG. 55E

BENDING FROM OPTICAL AXIS OF KEY LIGHT

PARALLEL TO OPTICAL AXIS OF KEY LIGHT

IMAGE DISPLAY APPARATUS

TECHNICAL FIELD

The present invention relates to a projection type image display device including a reflection type spatial light modulating element illuminated by an illuminating system and a projection optical system that forms an image of the reflection type spatial light modulating element.

This application claims the priority of the Japanese Patent Application No. 2002-363070 filed on Dec. 13, 2002, the entirety of which is incorporated by reference herein.

BACKGROUND ART

There has been proposed a projection type image display device including an illuminating system, a reflection type spatial light modulating element illuminated by the illuminating system and a projection optical system (projection lens) that forms an image of the reflection type spatial light modulating element. Using a discharge lamp as the light source of the illuminating system and a liquid crystal element as the reflection type spatial light modulating element, such an image display device is already in the actual use as a relatively large image display device.

The image display device can be produced at a reduced cost by adopting a structure in which a color filter is disposed for each pixel of one reflection type spatial light modulating element and a so-called sequential color display system in which an image is displayed in colors on the time-sharing basis. However, it cannot utilize light with a high efficiency and consumes much power.

The reason why the image display device cannot utilize with a high efficiency is as follows. Since the reflection type spatial light modulating element does not emit light but modulates the polarized state of incident light, it needs a means for splitting a light beam emitted from a light source into polarized components and thereafter synthesizing the split polarized components. Also, different from the self-luminous modulator, the light source emits light even for dark display and there takes place a loss of light corresponding to an efficiency of light utilization that depends upon the open area ratio of the reflection type spatial light modulating element.

In the conventional image display device, an improved efficiency of light utilization can be achieved by optical elements etc. included in the image display device as will be described below.

(Splitting of Light Beam into Polarized Components and Synthesis of Split Polarized Components)

The P-S conversion element is known as a polarization changing element which splits a light beam emitted from a light source of an illuminating system into polarized components and synthesizes the split polarized components. It is disposed between the light source and the reflection type spatial light modulating element. The P-S conversion element is formed by preparing a glass block formed by alternately attaching together glass sheets each having a polarization splitting layer formed from a multilayer film of an inorganic substance and glass sheets each having a reflecting surface formed thereon and cutting the glass block along a plane inclined in relation to the plane of attachment into plates.

A light beam as a mixture of P-polarized light and S-polarized light, incident upon the P-S conversion element, is split by the polarization splitting layer into the P-polarized light and S-polarized light. The P-polarized light and S-polarized light are split by each layer of the P-S conversion element and go out of the P-S conversion element. A half wave ($\lambda/2$) plate is disposed at the outgoing side of the P-S conversion element, corresponding to the S- or P-polarized light, whereby a light beam including only either the P- or S-polarized light can be provided.

Using such a P-S conversion element and half wave ($\lambda/2$) plate as the polarization splitter, it is possible to improve the efficiency of light utilization of an illuminating system which illuminates a reflection type spatial light modulating element that modulates a polarized component of incident light.

In the illuminating system, a light beam emitted from a light source is reflected by a parabolic mirror for incidence upon the P-S conversion element via a pair of fly-eye lenses. Then, the light beam is passed through the half wave ($\lambda/2$) plate and a condenser lens to the reflection type spatial light modulating element.

(Reflection Type Polarization Plate)

The conventional polarization plate allows one of polarized components to pass by while absorbing the other polarized component. However, there is known a reflection type polarization plate that allows one of polarized components to pass by while reflecting the other polarized component, not absorbing it. With the use of the reflection type polarization plate as a polarization changing element, it is possible to utilize the other polarized component by reflecting it again or manipulating it otherwise, thereby improving the efficiency of light utilization.

(Linear Polarization Plate Using Birefringence Multilayer Film)

The linear polarization plate using a birefringence multilayer film is formed by making multilayer lamination of two types of polymer films each having an index anisotropy and different in refractive index from each other and drawing the laminated polymer films. More specifically, the two types of laminated polymer films are coincident in refractive index with each other for one polarization-axial orientation, and different in refractive index from each other for the other polarization-axis orientation. By adjusting the refractive indexes different from each other, it is possible to provide a reflection type polarization plate which allows polarized light having one polarization-axis orientation to pass by while reflecting polarized light having the other polarization-axis orientation orthogonal to the one polarization-axis orientation.

Note that such a reflection type polarization plate is available under the trade name "DBEF" or "HMF" from the 3M.

(Circular Polarization Plate Using Cholesteric Liquid Crystal)

A circular polarization plate utilizing the selective reflectivity of a cholesteric liquid crystal can take the entire visible range as the selectively reflected wavelength band because the cholesteric pitch varies more than 100 nm as disclosed in the Japanese Patent Application Laid Open No. 281814/1994 for example. With the use of such a cholesteric circular polarization plate, it is possible to provide a circular polarization plate having no wavelength dependence.

A circular polarization plate using the cholesteric liquid crystal and a polarization changing element using the circular polarization plate are disclosed in the Japanese Patent No. 2509372 for example. The invention set forth in this Japanese Patent utilizes the fact that with the characteristic of the circular polarized light, that is, a change by 180 deg.

caused by one reflection, clockwise circular polarized light changes to counterclockwise circular polarized light, and vice versa.

A combination of the cholesteric liquid crystal with a reflecting mirror provides a polarization splitting synthesizer. The polarization splitting synthesizer using the above-mentioned linear polarization needs a half ($\lambda/2$) plate, but the polarization splitting synthesizer using the circular polarization needs not any half ($\lambda/2$) plate.

That is, a light beam emitted from the light source is either incident directly upon the cholesteric liquid crystal via a condenser lens or reflected by the reflecting mirror and then incident upon the cholesteric liquid crystal depending upon the outgoing direction of the light beam from the light source.

At this time, the circular polarized light in one direction passes by the cholesteric liquid crystal while the circular polarized light in the other direction is reflected by the cholesteric liquid crystal. Thus, the circular polarized light in the other direction, reflected by the cholesteric liquid crystal, is reflected by the reflecting mirror to be the circular polarized light in the one direction which will be incident again upon the cholesteric liquid crystal and pass by the latter. Each light passing by the cholesteric liquid crystal becomes the circular polarized light in the one direction.

The image display device using the aforementioned illuminating system have the following problems to solve:

The aforementioned illuminating system can only be produced through a complicated process of production. Thus, it is thus complicated to produce and expensive.

The circular polarization plate disclosed in the aforementioned Japanese Patent Application Laid Open No. 281814/1994 has no wavelength dependence but has no sufficient polarization splitting characteristic. On this account, it is necessary to use a combination of the circular polarization plate with a light absorption type polarization plate (which absorbs other polarized light) in order to assure a contrast required for the image display device. Therefore, it is difficult for the conventional image display device to have an improved efficiency of light utilization.

In the illuminating systems disclosed in the aforementioned Japanese Patent No. 2509372 and Japanese Patent Application Laid Open No. 281814/1994, the shape of a reflector used for the discharge lamp actually used as a light source or illumination of the reflection type spatial light modulating element by reflected light from the reflector is not so effective for an improved efficiency of light utilization as expected.

More specifically, since the shape of the actual reflector for the discharge lamp is a paraboloid or ellipsoid of revolution, so a light beam reflected by the polarization splitting element formed of a cholesteric liquid crystal to the light source is reflected twice by the reflector. When the light beam is reflected twice with the phase change caused by one reflection by the reflector being 180 deg., the phase will not be changed.

Further, since the reflector reflects the P-polarized light and S-polarized light with a difference in reflectance between them and these polarized rays of light are changed in phase and scattered due to passing by the glass tube of the discharge lamp as the light source, the effect of polarization changing will be lower. Also, in case the reflector is a parabolic mirror, a light beam emanated from a focal point will return to the focal point when it is reflected by the reflection type polarization plate, but a light beam emanated from any other point than the focal point will not always return to the point from which it has being emanated when it is reflected by the reflection type polarization plate.

Also, in case a spheroidal mirror is used as the reflecting mirror, light reflected by the cholesteric liquid crystal will be absorbed by the electrodes of the discharge lamp or diverged after reflected by the reflecting mirror, without returning to the light emission point of the light source, depending upon where the cholesteric liquid crystal is positioned. The "diversion" will increase the etendue of the light source, which will cause the efficiency of illumination-light utilization to be reduced.

As above, being disadvantageous in the efficiency of light utilization and manufacturing cost, the polarization changing element in the conventional illuminating system cannot return light to its source with a sufficient efficiency.

Also, in case the reflection type polarization plate has to be increased in area, the optical parts included in this illuminating system will be very expensive. Further, the light returned to the light source will possibly cause the illuminance to be nonuniform at the reflection type spatial light modulating element.

In addition, a part, made unnecessary for image display, of the illumination light having arrived at the reflection type spatial light modulating element may be returned to the light source and reused for illuminating the reflection type spatial light modulating element.

In this case, since the light emanated from the light source has arrived at the reflection type spatial light modulating element via a pair of fly-eye integrators for example, it will go back again to the light source through the fly-eye integrators. For reflecting the light having returned to the light source and directing it again toward the reflection type spatial light modulating element, the optical axis of an optical system located downstream of the fly-eye integrators has to be displaced in relation to that of the light source.

At this time, in case the optical axis of the optical system downstream of the fly-eye integrators is displaced only in one of longitudinal and lateral directions perpendicular to the optical axis, it is difficult to sufficiently reflect the light having returned to the light source.

Also, in case all the optical parts such as the projection optical system etc. located downstream of the fly-eye integrators are displaced in relation to the optical system including the light source and extending to the fly-eye integrators, all the optical systems will not possible be in line with each other. In this case, a support mechanism to support the optical systems will be extremely complicated and include many parts. Especially, the fly-eye integrators, condenser lens, field lens, etc. have to be aligned with each other with a high precision and thus the precision required for the support mechanism will be very high. The support mechanism will be difficult to produce.

DISCLOSURE OF THE INVENTION

Accordingly, the present invention has an object to provide an improved and novel image display device free from the above-mentioned drawbacks of the related art.

The present invention has also another object to provide an image display device which includes a non-luminous reflection type spatial light modulating element, a light source to illuminate the reflection type spatial light modulating element, and a projection optical system, is not complicatedly constructed and can thus be produced, not by any complicated process of production, and can utilize illumination light with an improved efficiency.

The above object can be attained by providing an image display device including according to the present invention:

a spheroidal reflecting mirror having an open end;

a light source provided at a first focal point of the spheroidal mirror;

a polarization changing element provided at the open end of the spheroidal mirror;

a reflection type polarization selecting element provided near a second focal point of the spheroidal mirror;

a first fly-eye integrator upon which light having passed by the reflection type polarization selecting element is incident;

a second fly-eye integrator upon which the light having passed by the first fly-eye integrator is incident;

a reflection type spatial light modulating element illuminated with the light having passed by the fly-eye integrator to modulate the illumination light correspondingly to an image to be displayed;

a light selecting means for splitting the light reflected by the reflection type spatial light modulating element into light to be returned to the second fly-eye integrator and light to be directed to a projection optical system correspondingly to the modulation by the reflection type spatial light modulating element; and a reflector to reflect the light returned by the light selecting means to the second fly-eye integrator, to thereby direct the light back to the reflection type spatial light modulating element.

In the above image display device, there is further provided a projection optical system that projects the light incident via the projection optical means as image projection light.

Also in this image display device according to the present invention, the reflection type polarization selecting element and reflector are disposed inside a minimum circle of confusion defined by light emitted from the light source and condensed by the spheroidal reflecting mirror to near the second focal point.

In the image display device, a part, made unnecessary for image display, of the light having arrived at the reflection type spatial light modulating element is returned to the light source and then guided again to the reflection type spatial light modulating element. Thus, the illumination light can be utilized with an improved efficiency.

In the image display device according to the present invention, since the reflection type polarization selecting element and reflector are disposed inside a minimum circle of confusion defined by light emitted from the light source and condensed by the spheroidal reflecting mirror to near the second focal point, so the reflection type polarized light selection means may be extremely small.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIGS. 34A to 34C schematically illustrate light paths in the image display device, showing how the nonuniform illuminance is caused by the recycled light, in which FIG. 34A shows the light path from the relay lens to reference mirror, FIG. 34B shows the light path returning from the relay lens to first fly-eye integrator and FIG. 34C shows the light path between the relay lens and first fly-eye integrator.

FIG. 35A to 35C also schematically illustrate a first system of light paths in which the problem of the nonuniform illuminance caused by the recycled light is solved, in which in which FIG. 35A shows the light path from the relay lens to reference mirror, FIG. 35B shows the light path returning from the relay lens to first fly-eye integrator and FIG. 35C shows the light path between the relay lens and first fly-eye integrator.

FIG. 36A to 36C also schematically illustrate a second system of light paths in which the problem of the nonuniform illuminance caused by the recycled light is solved, in which in which FIG. 36A shows the light path from the relay lens to reference mirror, FIG. 36B shows the light path returning from the relay lens to first fly-eye integrator and FIG. 36C shows the light path between the relay lens and first fly-eye integrator.

FIGS. 55A to 55E show a lens-barrel having a first construction used in the image display device, in which FIG. 55A is a longitudinal sectional view of a portion of the lens-barrel extending from the light source to the projection lens, FIG. 55B is a front view of the lens-barrel portion in FIG. 55A, FIG. 55C is a perspective view of only a portion of the lens-barrel at the light source, FIG. 55D is a perspective view of the holder, and FIG. 55E is a perspective view of only a portion of the lens-barrel at the projection lens side.

BEST MODE FOR CARRYING OUT THE INVENTION

The image display device according to the present invention will be described in detail below with reference to the accompanying drawings.

Figure 1:
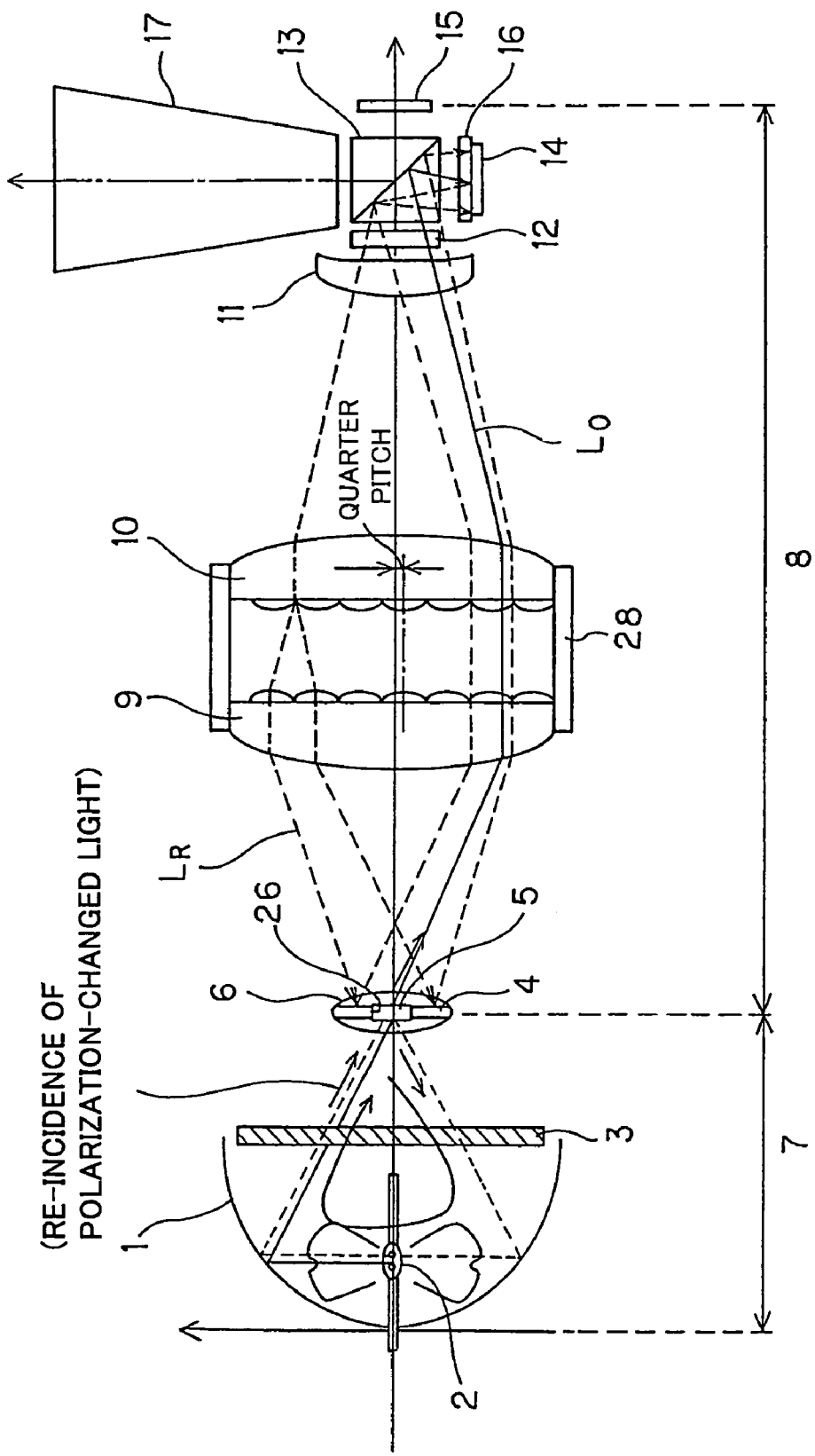
FIG. 1 is a longitudinal sectional view of the image display device according to the present invention.

As shown in FIG. 1, the image display device according to the present invention includes a spheroidal reflecting mirror 1 having a spheroidal shape and open at the end thereof, and a light source 2 disposed on a first focal point of the spheroidal reflecting mirror 1. The light source 2 is a discharge lamp such as a UHP (ultra-high pressure mercury) lamp.

Figure 2:
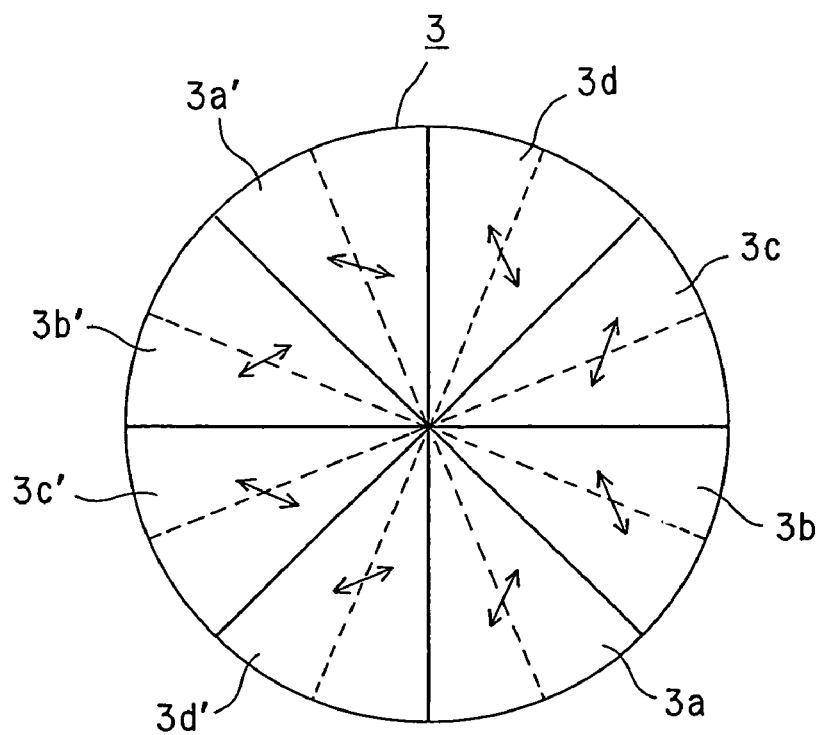
FIG. 2 is a front view of the polarization changing element included in the image display device according to the present invention.

At the open end of the spheroidal reflecting mirror 1, there is provided a polarization changing element 3. As shown in FIG. 2, the polarization changing element 3 includes a quarter or half wave plate having an even number of areas extending radially and symmetrically with respect to the optical axis.

Near a second focal point of the spheroidal reflecting mirror 1, there is provided a relay lens block 6 having an opening 26 formed in the center thereof and having disposed therein a toroidal annular reflector 4 having a reflection type polarization selecting element 5 disposed in the central opening thereof. The reflection type polarization selecting element 5 is a reflection type circular polarization plate or a reflection type polarization plate (so-called "wire-grid polarizer"). In case the reflection type polarization selecting element 5 is a reflection type circular polarization plate, a quarter wave plate is as the polarization changing element 3. Also, in case the reflection type polarization selecting element 5 is a reflection type polarization plate, a half wave plate is as the polarization changing element 3.

In the optical system of this image display device, the components including from the light source 2 to reflection type polarization selecting element 5 disposed as above form together a polarization changer 7.

In the above polarization changer 7, light passed to the reflection type polarization selecting element 5 via the polarization changing element 3 undergoes polarization splitting, and the light reflected by the reflection type polarization selecting element 5 is returned to the light source 2 via the polarization changing element 3 and spheroidal reflecting mirror 1. The light thus returned to the light source 2 passes by an arc gap, reflected by the opposite side of the spheroidal reflecting mirror 1, passes by the polarization changing element 3 again, and arrives at the reflection type polarization selecting element 5. At this time, the light is changed to have a polarized state in which it will pass by the reflection type polarization selecting element 5. In this way, all the light having passed by the reflection type polarization selecting element 5 are polarized to have a specific state.

First, the image display device in which the polarization changing element 3 is a quarter wave plate and the reflection type polarization selecting element 5 is a reflection type circular polarization plate will be described herebelow. It should be noted here that the quarter wave plate should preferably be able to function in a wide wavelength band. Also, the reflection type circular polarization plane may be a circular polarization plate formed from a cholesteric liquid crystal polymer. It should be noted that a reflection-preventive layer is formed on the boundary where each optical element is in contact with air.

As shown in FIG. 2, the polarization changing element 3 is divided into an even number of areas 3a, 3b, 3c, 3d, 3a', 3b', 3c' and 3d' extending radially and symmetrically with respect to the optical axis. The lag axis of each of these areas is directed to form an angle of 45 deg. with a straight line connecting the center of each area and optical axis, and is perpendicular to that of one of the areas which is symmetrical with the area in consideration with respect to the optical axis.

The light emitted from the light source 2 passes by the quarter wave plate of the polarization changing element 3 to be changed to circularly polarized light, and arrives at the reflection type polarization selecting element 5 which is a reflection type circular polarization plate. At this time, the incident light upon the incident surface of the reflection type circular polarization plate is a one- or other-directional circularly polarized light. And, the one-directional circularly polarized light is reflected by the reflection type circular polarization plate toward the light source 2.

The light reflected by the reflection type polarization selecting element 5 as a reflection type circular polarization plate passes by the quarter wave plate of the polarization changing element 3, is reflected twice by the spheroidal reflecting mirror 1, and arrives again at the quarter wave plate of the polarization changing element 3. At this time, the light will arrive at an area 3$a'$, for example, symmetrical with the area 3$a$, for example, of the areas of the polarization changing element 3 by which the light has passed after being reflected by the reflection type circular polarization plate, with respect to the optical axis.

Since all the light having thus arrived at the polarization changing element 3 have already passed twice by the quarter wave plate of the polarization changing element 3 and by the reflection type circular polarization plate, so they have a linearly polarized state such as P- or S-polarization, and thus they have no phase difference among them. Therefore, the light having passed by an area formed from the quarter wave plate whose direction is perpendicular to the lag axis will be a circularly polarized one whose direction is opposite to that thereof initially incident upon the reflection type polarization selecting element 5, and pass by the latter. Thus, polarization is changed in the polarization changer.

Also, there will be described below an image display device in which the polarization changing element 3 is a half wave plate and the reflection type polarization selecting element 5 is a reflection type polarization plate. Also in this case, the polarization changing element 3 is divided into an even number of areas extending radially and symmetrical with respect to the optical axis. The lag axis of each of these areas is directed to form an angle of 45 deg., for example, with a straight line connecting the center of each area and optical axis, and is perpendicular to that of one of the areas which is positioned to be symmetrical with the area in consideration with respect to the optical axis.

The light emitted from the light source 2 passes by the half wave plate of the polarization changing element 3 to have the direction of polarization thereof rotated, and arrives at the reflection type polarization selecting element 5 which is a reflection type polarization plate. And, one-directional polarized light is reflected by the reflection type polarization plate toward the light source 2.

The light reflected by the reflection type polarization selecting element 5 as a reflection type circular polarization plate passes by the half wave plate of the polarization changing element 3, is reflected twice by the spheroidal reflecting mirror 1, and arrives again at the half wave plate of the polarization changing element 3. At this time, the light will arrive at an area symmetrical with the one of the areas of the polarization changing element 3 by which the light has passed after being reflected by the reflection type polarization plate, with respect to the optical axis.

Since all the light having thus arrived at the polarization changing element 3 have already passed twice by the half wave plate of the polarization changing element 3 and by the reflection type circular polarization plate, they have a linearly polarized state such as P- or S-polarized light, and thus they have no phase difference among them. Therefore, the light having passed by an area formed from the half wave plate whose direction is perpendicular to the lag axis will be a linearly polarized one whose direction is opposite to that thereof initially incident upon the reflection type polarization selecting element 5, and pass by the latter. Thus, polarization is changed in the polarization changer.

Note that the spheroidal reflecting mirror 1 may be a paraboloid mirror combined with a convex lens. In this case, the light emitted from the light source is changed by the paraboloid mirror into a parallel light beam which will be condensed by the convex lens. The relay lens block 6 is disposed near the focal point of the convex lens.

In the polarization changer 7, the reflection type circular polarization plate may use a linear polarization plate using a birefringence multilayer film. The reflection type polarization plate is formed by drawing two types of polymer films different in refractive index from each other into a multilayer laminate. With the refractive index of one of the two types of polymer films being adjusted to that of the other polymer film, the reflection type polarization plate will allow polarized light guided along one polarization axis to pass by and reflect polarized light directed perpendicularly to the former polarized light. The linear polarization plate of this type is available under the trade name "DBEF" or "HMF" from the 3M, for example.

Also, the wire-grid polarizer as the reflection type polarization plate has a structure in which a stripe-shape aluminum layer is laid over a glass substrate. It reflects one linear polarized light while allowing the other linear polarized light to pass by. Such a wire-grid polarizer has already been put to practical use by the Moxtek.

Next, the light having passed by the polarization changer as above will be incident upon a recycled light optical system 8 as shown in FIG. 1. In this recycled light optical system 8, the polarization-changed light having passed by the reflection type polarization selecting element 5 is passed through first and second fly-eye integrators 9 and 10, field lens 11, color selecting element 12 and a polarizing beam splitter (PBS) 13 corresponding to the wide wavelength band to first and second reflection type spatial light modulating elements 14 and 15.

Each of the first and second fly-eye integrators 9 and 10 is composed of a convex lens at one side thereof and a fly-eye lens at the other side, formed integrally with each other. The first and second fly-eye integrators 9 and 10 are disposed with their fly-eye lenses being opposite to each other.

The color selecting element 12 selects only light whose wavelength is within a specific wavelength band, for example, a red light beam, and rotates the polarization axis of the selected light to polarized the latter in a direction different from the directions in which blue and green rays of light, for example, are polarized. This color selecting element 12 is well known, and commercially available under the trade name "COLOR SELECT" from the Color Link.

Also, a reflection type color filter 16 is provided at the light-incident side of the first reflection type spatial light modulating element 14. The reflection type color filter 16 is formed from an inorganic material but it may be formed from an organic material.

In the recycled light optical system 8, two color beams, for example, blue and green light beams, are reflected at the reflective surface of the polarizing beam splitter 13 to illuminate the first reflection type spatial light modulating element 14. The two color beams are S-polarized in relation to the reflective surface of the polarizing beam splitter 13. The reflection type color filter 16 selects the two color beams and projects them onto only pixels corresponding to blue and green, but reflects the components not so projected.

In the recycled color optical system 8, the reflective surface of the polarizing beam splitter 13 allows the remaining one color beam, for example, red beam, to pass by and illuminate the second reflection type spatial light modulating element 15. The one color beam is P-polarized in relation to the reflective surface of the polarizing beam splitter 13.

That is, in the recycled light optical system 8, the color selecting element 12 and reflective surface of the polarizing beam splitter 13 form together a color selecting means for splitting the light from the light source spatially into color light components. Also, the reflection type color filter 16 serves as a color selecting means for further splitting the light selected by the color selecting element 12 and reflective surface of the polarizing beam splitter 13 spatially into color components.

The light modulated by the first reflection type spatial light modulating element 14 is P-polarized in relation to the reflective surface of the polarizing beam splitter 13, reflected by the first reflection type spatial light modulating element 14, passes by the reflective surface of the polarizing beam splitter 13, incident upon the projection lens 17, and projected by the projection lens 17 onto a screen (not shown). The light not modulated but reflected by the first reflection type spatial light modulating element 14 is reflected along with the light reflected by the reflection type color filter 16 by the reflective surface of the polarizing beam splitter 13 back to the light source 2.

The light modulated by the second reflection type spatial light modulating element 15 is P-polarized in relation to the reflective surface of the polarizing beam splitter 13, reflected by the second reflection type spatial light modulating element 15 and then by the reflective surface of the polarizing beam splitter 13, incident upon the projection lens 17, and projected by the projection lens 17 onto the screen (not shown). The light not modulated but reflected by the second reflection type spatial light modulating element 15 passes by the reflective surface of the polarizing beam splitter 13 and returns to the light source 2.

As above, in the recycled light optical system 8, the reflected light other than the light selected and allowed to pass by the reflection type color filter 16, and the non-modulated light which is not used for color signal-based image display in the reflection type spatial light modulating elements 14 and 15, will return to the light source 2.

Note that in the optical system included in the image display device, the light source 2, fly-eye lens surface of the first fly-eye integrator 9 and the reflection type spatial light modulating elements 14 and 15 are conjugate with each other, and also the relay lens block 6 and the fly-eye lens surface of the second fly-eye integrator 10 are conjugate with each other.

Figure 3:
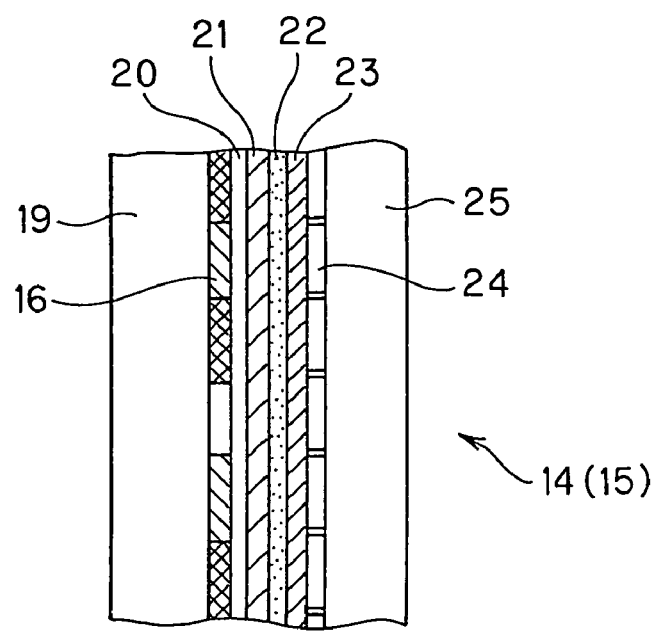
FIG. 3 is a longitudinal sectional view of the substantial part of the reflection type spatial light modulating element included in the image display device according to the present invention.

In this embodiment, each of the two reflection type spatial light modulating elements 14 and 15 uses reflection type liquid crystal display element. As shown in FIG. 3 for example, each of the reflection type spatial light modulation elements 14 and 15 includes a substrate 19, reflection type color filter 16, transparent electrode 20, orientation layer 21, liquid crystal layer 22, orientation layer 23, reflective electrode 24 and active matrix substrate 25, stacked one on the other in this order. It should be noted that the second reflection type spatial light modulating element 15 includes no reflection type color filter 16. The reflective electrode 24 is formed correspondingly to an effective pixel range.

In these reflection type spatial light modulating elements 14 and 15, ineffective area around the effective pixel range may be formed as a reflective area. In this case, the illumination light off the effective pixel range can be reflected by the reflective area back to the light source.

In this image display device, the light that illuminates the reflection type spatial light modulating elements 14 and 15 has an unnecessary light part thereof which will not pass by the color filter 16 reflected by the reflection type color filter 16. For example, blue light (B) or green light (G) is reflected by a red light (R) color filter back to the light source. Also, the light that illuminates the reflection type spatial light modulating elements is polarized in a specific direction, that is, S- or P-polarized in relation to the reflective surface of the polarizing beam splitter 13. The light whose polarized state has been changed correspondingly to an image to be displayed is directed toward the projection lens as above, but the light whose polarized state has not been changed is returned to the light source through the reflective surface of the polarizing beam splitter 13. The light thus returned to the light source is reflected by the reflector 4 supported by the relay lens block 6 to illuminate the reflection type spatial light modulating elements 14 and 15, whereby the light from the light source can be utilized with an improved efficiency.

Note that in this image display device, the reflection type spatial light modulating elements 14 and 15 are not limited to the reflection type liquid crystal display element provided with the reflection type color filter as mentioned above but may use "HTPS" (a transmission type liquid crystal type) with a reflection type color filter. Also, each of the reflection type spatial light modulating elements 14 and 15 may be of a so-called field-sequential or color-wheel type. One of these reflection type liquid crystal display elements is illuminated via a color selecting means which temporally splits light into color components to modulate the light on the basis of a plurality of color components in the time sharing manner.

Further, according to the present invention, it is possible to utilize the light with an improved efficiency by recycling the light in all image display devices in which there is provided a means for select light in a specific color, non-modulated light or the like and reflecting it in an optical system provided downstream of the color selecting element 12.

In the image display device according to the present invention, each of the fly-eye integrators 9 and 10 is a predetermined distance off the optical disk of the entire optical system, that is, the optical axis common to the relay lens block 6, field lens 11 and projection lens 17 in a direction perpendicular to the optical disk as shown in FIG. 1. Namely, in each of the fly-eye integrators 9 and 10, the central one of fly-eye lenses equal in size to the fly-eye lens surface of the fly-eye integrator and disposed with a constant pitch is a distance equal to a quarter of the fly-eye lens pitch off the optical axis of the relay lens block 6 in a direction perpendicular to at least this optical axis.

Since the plurality of fly-eye lenses on the fly-eye lens surface is disposed vertically and horizontally in the form of a matrix, so the optical axis of the fly-eye integrators 9 and 10 may be a quarter of the fly-eye lens pitch off the optical axis in a vertical direction or horizontal direction in which the fly-eye lenses are disposed, or in each of both the vertical and horizontal directions in which the fly-eye lenses are disposed. In case the fly-eye integrators 9 and 10 are the quarter pitch off the optical axis in each of the vertical and horizontal directions in which the fly-eye lenses are disposed, the shift is ($\sqrt{2}$)/4 pitch.

Figure 4:
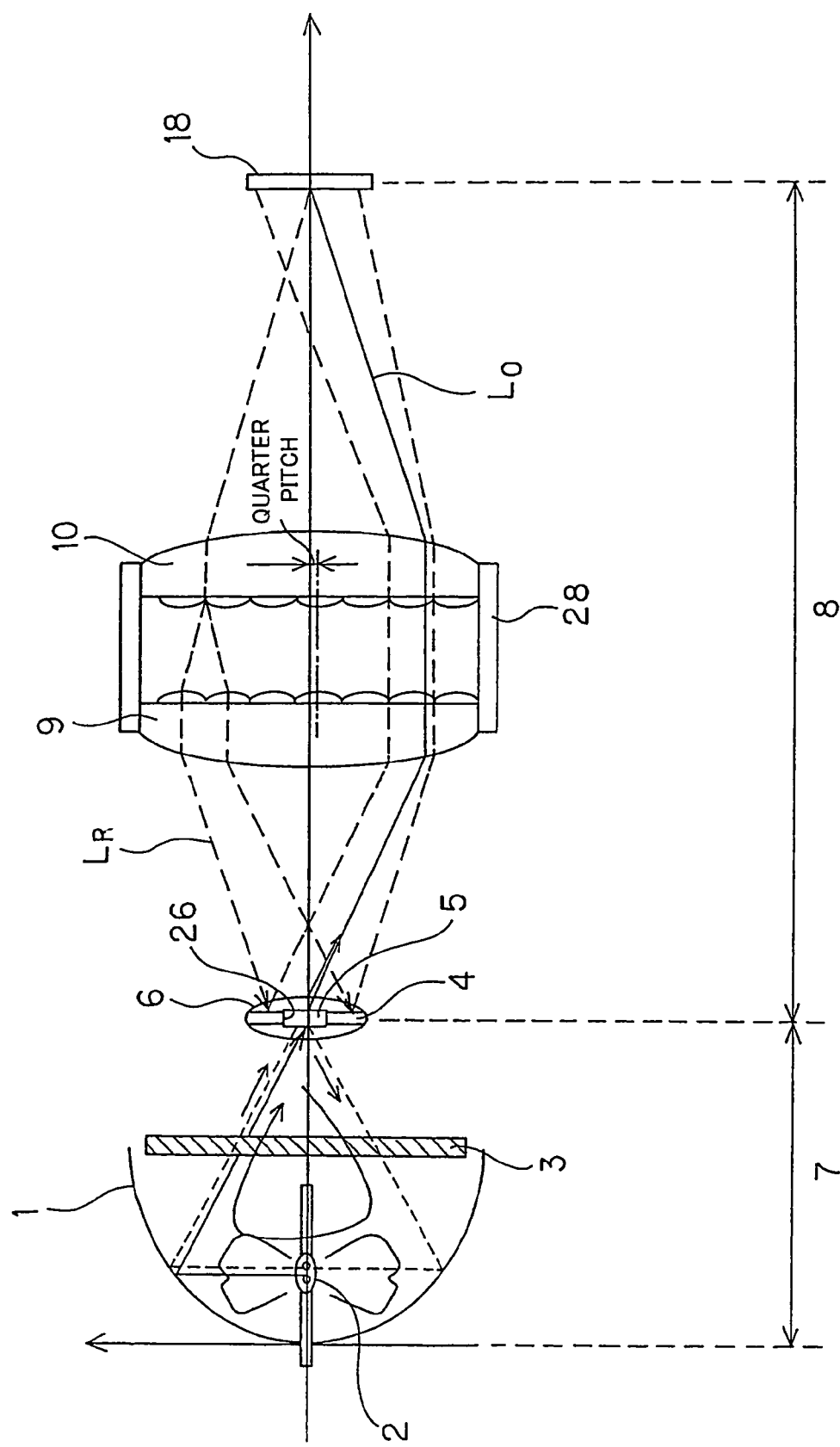
FIG. 4 is a longitudinal sectional view of the light path for to-be-recycled light in the image display device according to the present invention.

Since each of the fly-eye integrators 9 and 10 is off the optical axis as above, the light beam returned from each of the spatial light modulating elements 14 and 15 to the light source 2 will have the optical axis thereof be a distance equal to a half of the fly-eye lens pitch off the light traveling toward each of the spatial light modulating elements 14 and 15 as will be seen in FIG. 4 It should be noted that in FIG. 4, a reference mirror 18 is shown in place of the optical system provided downstream of the field lens 11 in order to make clear the path of the light returning to the light source 2.

More specifically, the light beam having passed by the apex of each fly-eye lens in the second fly-eye integrator 10 along the going path to each of the spatial light modulating elements 14 and 15 is returned to the boundary between the fly-eye lenses in the second fly-eye integrator 10 along the return path from each of the spatial light modulating elements 14 and 15, and the light beam having traveled along the return path will thus be split from the light beam having traveled along the going path. Then, at the relay lens block 6 conjugate with the fly-eye lens surface of the second fly-eye integrator 10, the light beam will return to a position off the opening 26 (reflection type polarization selecting element 5) in the reflector 4 by which the light beam traveling along the going path passes, and the return light will be reflected by the reflector 4. Then, the light goes back to each of the reflection type spatial light modulating elements 14 and 15 and will illuminate the latter.

Figure 5A:
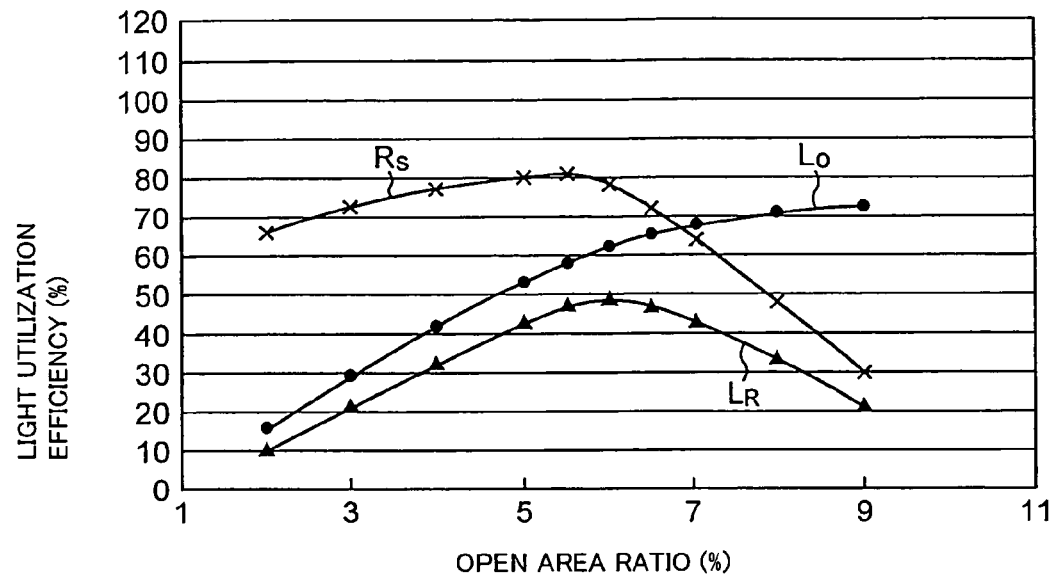
FIG. 5A graphically shows the efficiency of illumination-light utilization in the image display device and FIG. 5B also graphically shows the illumination efficiency of the illumination light.

Here will be described the efficiency with which the light emitted from the light source 2 will be utilized in the image display device. In this image display device, the larger the diameter of the opening (that of the reflection type polarization selecting element 5) in the reflector 4 by which the light beam traveling along the goring path in the relay lens block 6 is, zero-order illumination light $L_O$ as light emitted from the light source 2 to illuminate directly the reflection type spatial light modulating elements 14 and 15 is utilized with an improved efficiency as shown in FIG. 5A. According to this embodiment, about 73% of the light is utilized under the conditions that the diameter of the opening in the reflector 4 is 9 mm and light-source energy is 100%.

Also in this image display device, in case the diameter of the opening 26 (that of the reflection type polarization selecting element 5) in the reflector 4 by which the light beam traveling along the going path in the relay lens block 6 is appropriate, the light beam will return from the reflection type spatial light modulating elements 14 and 15 to the light source 2 twice or more times, and so recycled light $L_R$ as light which illuminates again the reflection type spatial light modulating elements 14 and 15 will be utilized with a maximum efficiency. According to this embodiment, about 50% of the light is utilized under the conditions that the diameter of the opening in the reflector 4 is 6 mm and light-source energy is 100%.

The above means that in this design example of the image display device, a diameter of 6 mm of the opening 26 in the reflector 4 is just appropriate for a good balance between an efficiency of recycling $R_S$ as the efficiency of utilization of the recycled light $L_R$ and efficiency of utilization of the zero-order illumination light $L_O$.

Next, there will be explained the relation between the radius of the opening 26 in the reflector 4 in the relay lens block 6 and the efficiency of illumination as the efficiency of utilization of the light emitted from the light source 2.

Figure 5B:
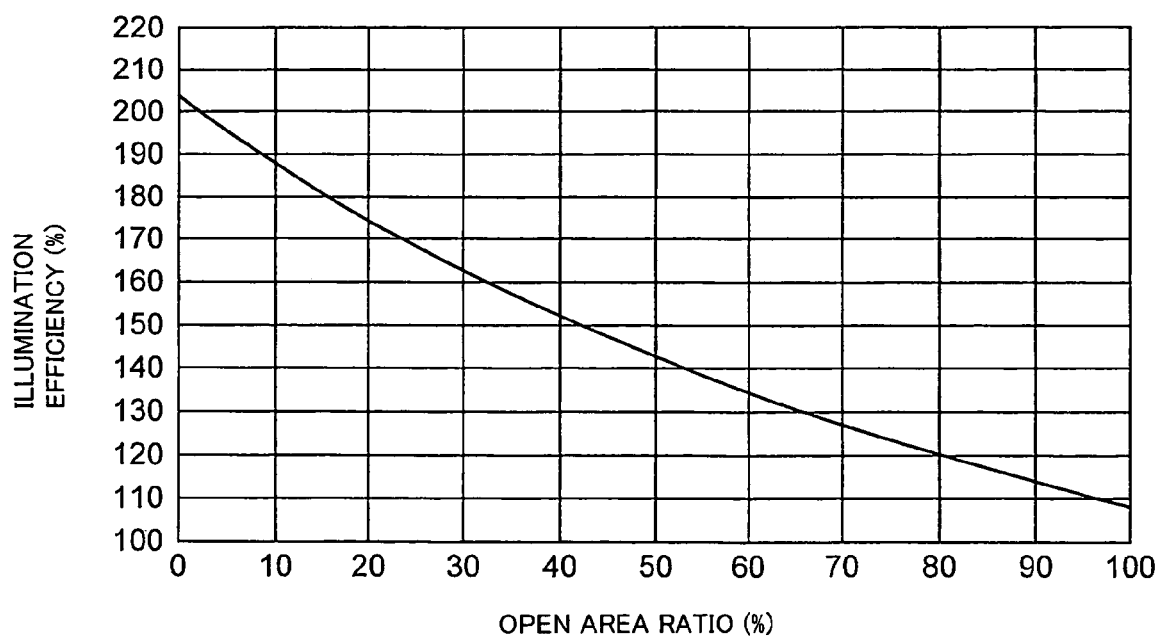

With the ratio of non-reflecting surface area being plotted along the vertical axis, the efficiency of illumination will be about 200% where the ratio of a non-reflecting surface area is about 5% and the reflecting surface area is larger as shown in FIG. 5B. Also, where the non-reflecting surface area ratio is 100% with no reflecting surface area, the efficiency of illumination is about 110%.

Note that the above data are those in a two-panel type image display device in which the size (diagonal length) of the reflection type spatial light modulating elements is 0.75 inch and the value F of the illumination optical system is 2.4.

Normally, in case two reflection type spatial light modulating elements are used, green (G) and blue (B) color filters, for example, are laid on one of the reflection type spatial light modulating elements. With the color filters being of a reflection type, open area ratio of the reflection type spatial light modulating element, etc. being taken in consideration, the reflecting surface area has a ratio of 65% or more while the non-reflecting surface area has a ratio of 35%. So, the minimum efficiency of illumination can be 1.5 times higher while the maximum efficiency of illumination can be 2 times higher.

Also, since only a red (R) color filter, for example, is laid on the other reflection type spatial light modulating element, the area of the other reflection type spatial light modulating element under the color filter can be nearly 2 times larger for green (G) light and blue (B) light than that of the one reflection type spatial light modulating element and thus the efficiency of illumination can also be 2 timers larger. Further, the peak brightness of the red (R) color is 1.1 to 2 times higher because of the reflecting surface area.

In this image display device, a position on the second focal point of the spheroidal reflecting mirror 1 is not always best as the location of the relay lens block 6 formed with the reflector 4 having the central opening and reflection type polarization selecting element 5 being placed between the relay lenses. That is, by placing the relay lens block 6 nearer to the light source 2 than to the second focal point of the spheroidal reflecting mirror 1, it is possible in some cases to utilize the light beam having passed by the opening in the reflector 4 with an improved efficiency and improve the efficiency of illumination (effect of recycling) of the reflection type spatial light modulating elements.

The reason for the above is that since the bulb electrode of the discharge lamp as the light source has an arc gap of about 1 to 1.5 mm, the light emitted from the light source will not always define any minimum circle of confusion at the second focal point of the spheroidal reflecting mirror 1.

Namely, by disposing the relay lens block 6 in a position where the light from the light source will define a minimum circle of confusion, the efficiency of illumination can be improved. Also in this case, it is possible to use the reflection type polarization selecting element 5 and relay lens block 6 each of a smaller size (diameter) and thus reduce the costs of device components. It should be noted that in many cases, the minimum circle of confusion is defined in a position nearer to the light source than to the second focal point.

Figure 6:
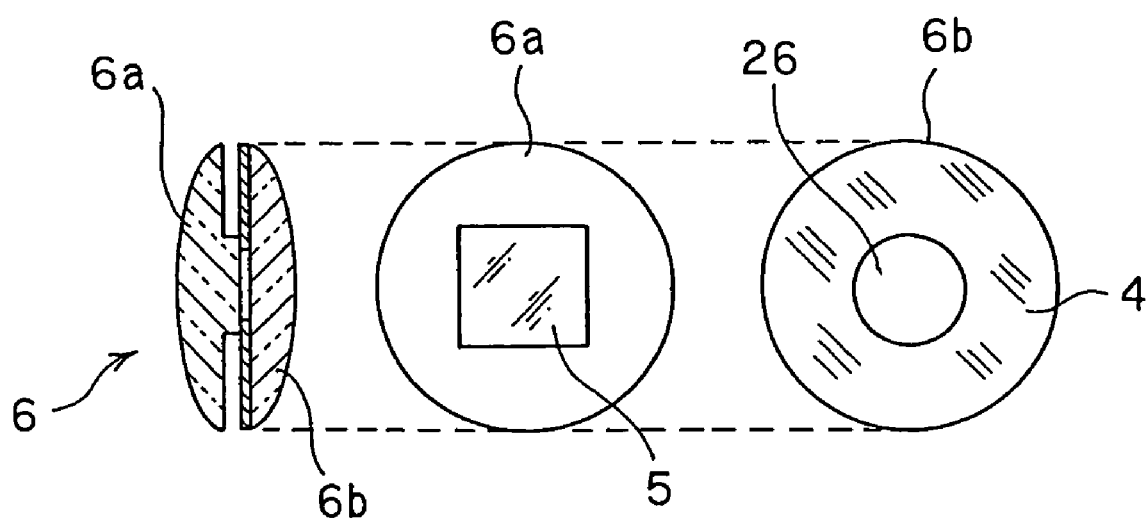
FIGS. 6 to 33 are exploded views of a relay lens block used in the image display device according to the present invention.

As shown in FIG. 6, the relay lens block 6 may be formed by attaching a rectangular reflection type polarization selecting element 5 at the center of one of relay lenses (6a), attaching a reflector 4 having a circular opening formed therein to the other relay lens 6b and thus attaching the relay lenses 6a and 6b to each other with the reflection type polarization selecting element 5 and reflector 4 sandwiched between the relay lenses 6a and 6b.

Figure 7:
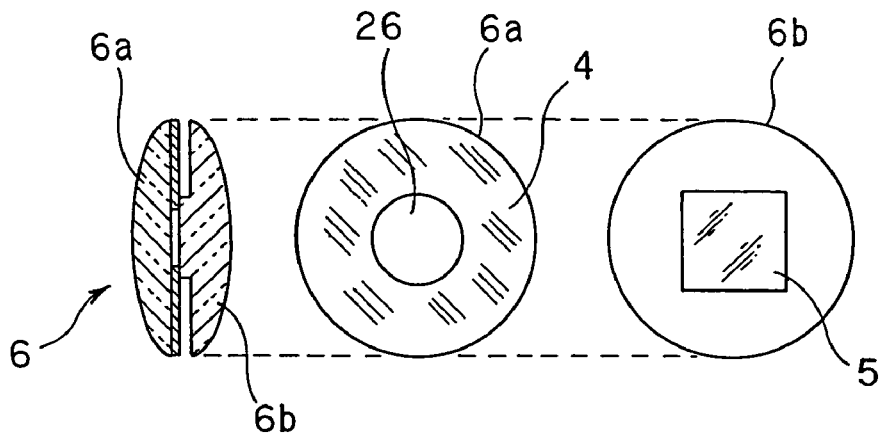

Also, the relay lens block 6 may be formed by attaching the reflector 4 having the circular opening formed therein to the one relay lens 6a, attaching the rectangular reflection type polarization selecting element 5 to the center of the other relay lens 6b, and attaching the relay lenses 6a and 6b to each other with the reflection type polarization selecting element 5 and reflector 4 being sandwiched between the relay lenses 6a and 6b, as shown in FIG. 7.

Figure 8:
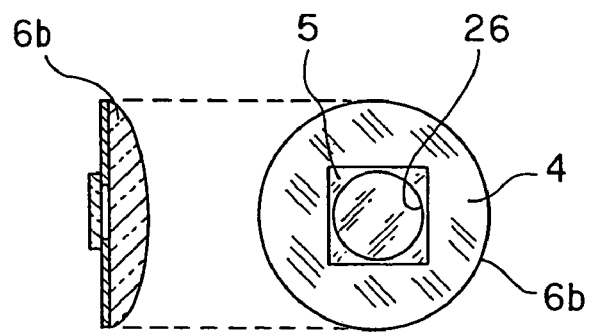

Also, the relay lens block 6 may be formed by attaching the reflector 4 having the circular opening formed therein to the other relay lens 6b, attaching the rectangular reflection type polarization selecting element 5 to the center of the other relay lens 6b, and attaching the one relay lens 6a to the other relay lens 6*b* with the reflection type polarization selecting element 5 and reflector 4 being sandwiched between the relay lenses 6*a* and 6*b*, as shown in FIG. 8.

Figure 9:
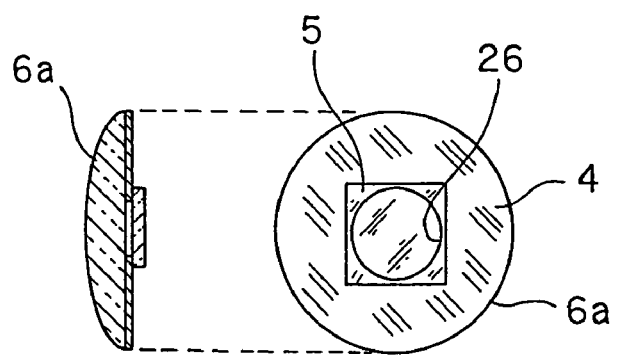

Also, the relay lens block 6 may be formed by attaching the reflector 4 having the circular opening formed therein to the one relay lenses 6*a*, attaching the rectangular reflection type polarization selecting element 5 to the center of the one relay lens 6*a*, and attaching the other relay lens 6*b* to the one relay lens 6*a* with the reflection type polarization selecting element 5 and reflector 4 being sandwiched between the relay lenses 6*a* and 6*b*, as shown in FIG. 9.

Figure 10:
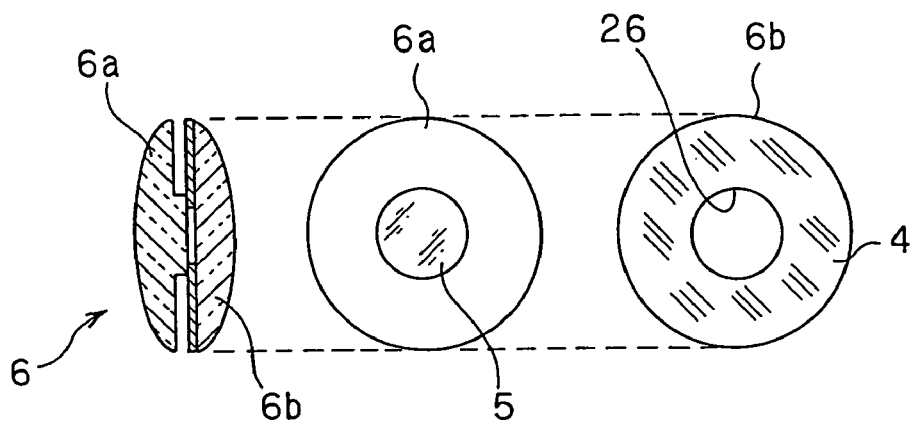

Also, the relay lens block 6 may be formed by attaching a circular reflection type polarization selecting element 5 to the center of the one relay lens 6*a*, attaching the reflector 4 having the circular opening formed therein to the other relay lens 6*b*, and attaching the relay lens 6*a* and 6*b* to each other with the reflection type polarization selecting element 5 and reflector 4 being sandwiched between the relay lenses 6*a* and 6*b*, as shown in FIG. 10.

Figure 11:
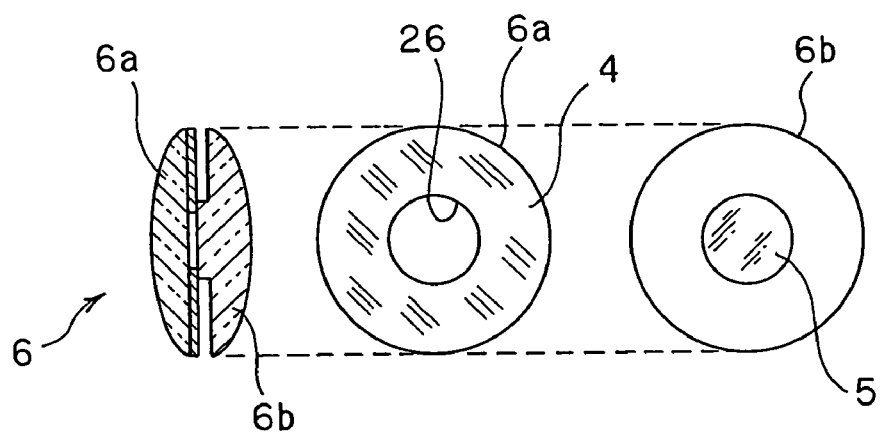

Also, the relay lens block 6 may be formed by attaching the reflector 4 having the circular opening formed therein to the one relay lens 6*a*, attaching a circular reflection type polarization selecting element 5 to the center of the other relay lens 6*b*, and attaching the relay lenses 6*a* and 6*b* to each other with the reflection type polarization selecting element 5 and reflector 4 being sandwiched between the relay lenses 6*a* and 6*b*, as shown in FIG. 11.

Figure 12:
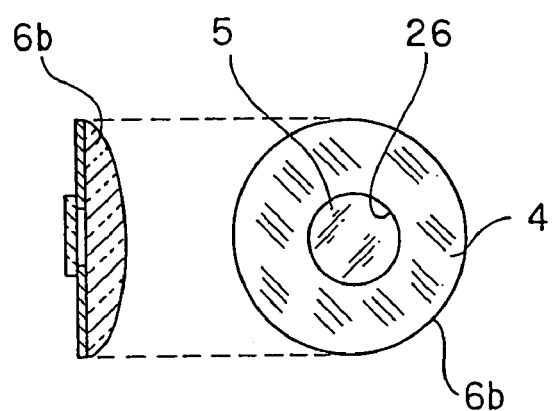

Also, the relay lens block 6 may be formed by attaching the reflector 4 having the circular opening formed therein to the other relay lens 6*b*, attaching the circular reflection type polarization selecting element 5 to the center of the other relay lens 6*b*, and attaching the one relay lens 6*a* to the other relay lens 6*b* with the reflection type polarization selecting element 5 and reflector 4 being sandwiched between the relay lenses 6*a* and 6*b*, as shown in FIG. 12.

Figure 13:
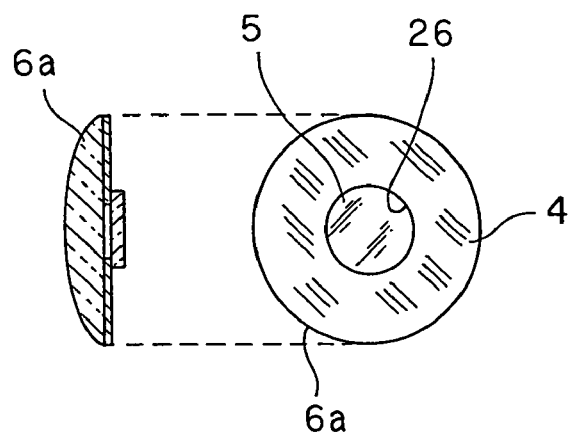

Also, the relay lens block 6 may be formed by attaching the reflector 4 having the circular opening formed therein to the one relay lenses 6*a*, attaching the circuit reflection type polarization selecting element 5 to the center of the one relay lens 6*a*, and attaching the other relay lens 6*b* to the one relay lens 6*a* with the reflection type polarization selecting element 5 and reflector 4 being sandwiched between the relay lenses 6*a* and 6*b*, as shown in FIG. 13.

Figure 14:
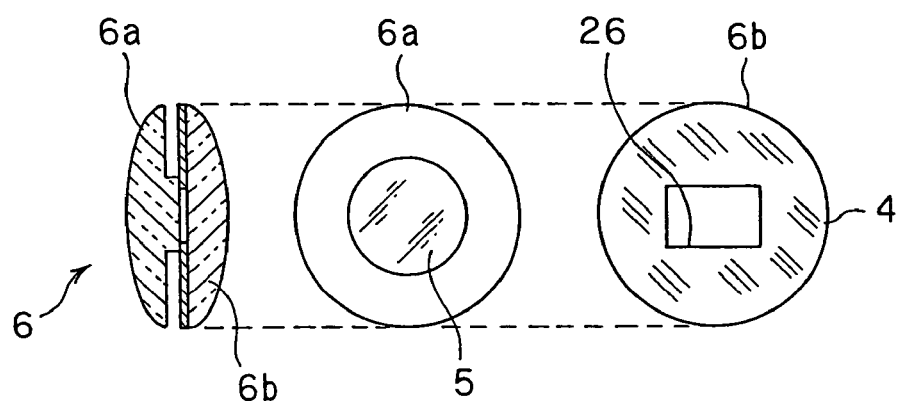

Also, the relay lens block 6 may be formed by attaching the circular reflection type polarization selecting element 5 to the center of the one relay lens 6*a*, attaching a reflector 4 having a rectangular opening formed therein to the other relay lens 6*b*, and attaching the relay lens 6*a* and 6*b* to each other with the reflection type polarization selecting element 5 and reflector 4 being sandwiched between the relay lenses 6*a* and 6*b*, as shown in FIG. 14.

Figure 15:
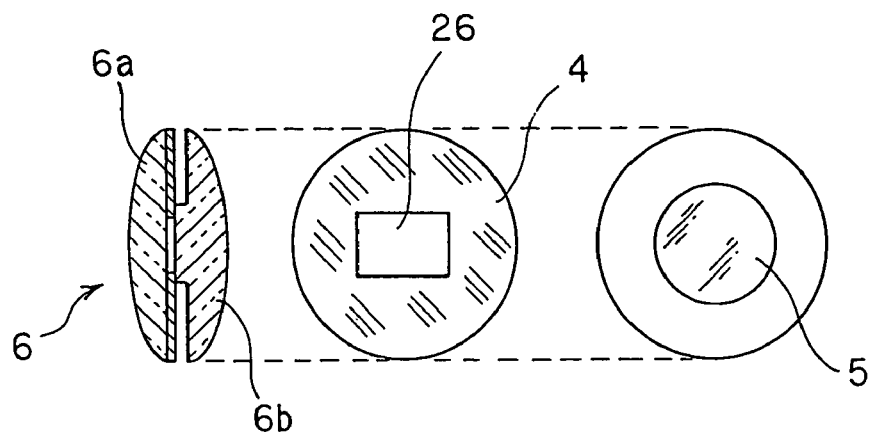

Also, the relay lens block 6 may be formed by attaching the reflector 4 having the rectangular opening formed therein to the one relay lens 6*a*, attaching the circular reflection type polarization selecting element 5 to the center of the other relay lens 6*b*, and attaching the relay lenses 6*a* and 6*b* to each other with the reflection type polarization selecting element 5 and reflector 4 being sandwiched between the relay lenses 6*a* and 6*b*, as shown in FIG. 15.

Figure 16:
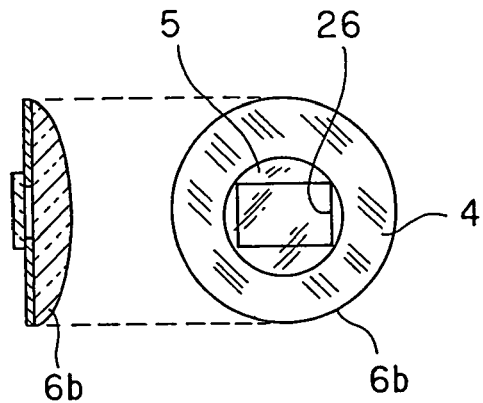

Also, the relay lens block 6 may be formed by attaching the reflector 4 having the rectangular opening formed therein to the other relay lens 6*b*, attaching the circular reflection type polarization selecting element 5 to the center of the other relay lens 6*b*, and attaching the one relay lens 6*a* to the other relay lens 6*b* with the reflection type polarization selecting element 5 and reflector 4 being sandwiched between the relay lenses 6*a* and 6*b*, as shown in FIG. 16.

Figure 17:
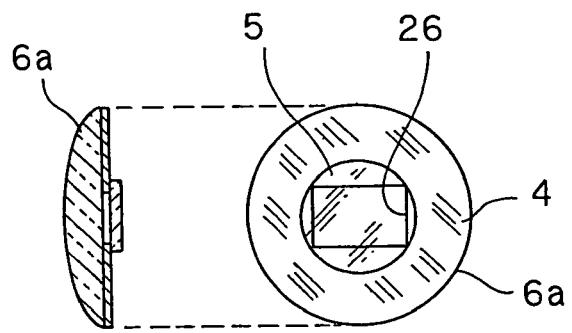

Also, the relay lens block 6 may be formed by attaching the reflector 4 having the rectangular opening formed therein to the one relay lens 6*a*, attaching the circular reflection type polarization selecting element 5 to the center of the one relay lens 6*a*, and attaching the other relay lens 6*b* to the one relay lens 6*a* with the reflection type polarization selecting element 5 and reflector 4 being sandwiched between the relay lenses 6*a* and 6*b*, as shown in FIG. 17.

Figure 18:
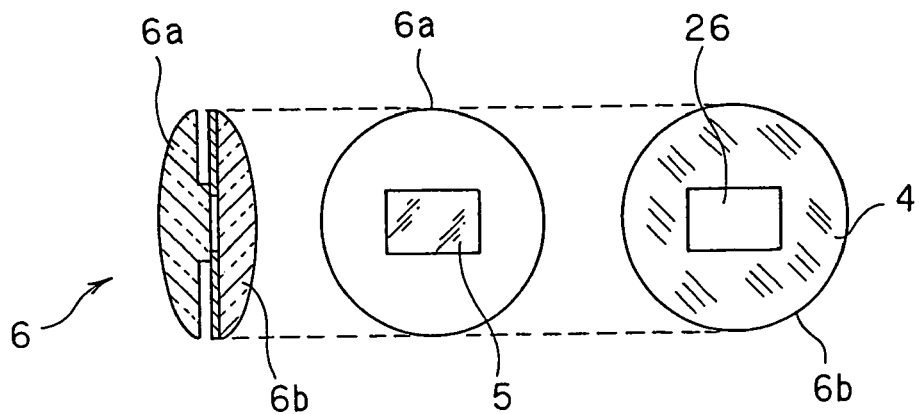

Also, the relay lens block 6 may be formed by attaching the rectangular polarization selecting element 5 to the center of the one relay lens 6*a*, attaching the reflector 4 having the rectangular opening formed therein to the other relay lens 6*b*, and attaching the relay lenses 6*a* and 6*b* to each other with the reflection type polarization selecting element 5 and reflector 4 being sandwiched between the relay lenses 6*a* and 6*b*, as shown in FIG. 18.

Figure 19:
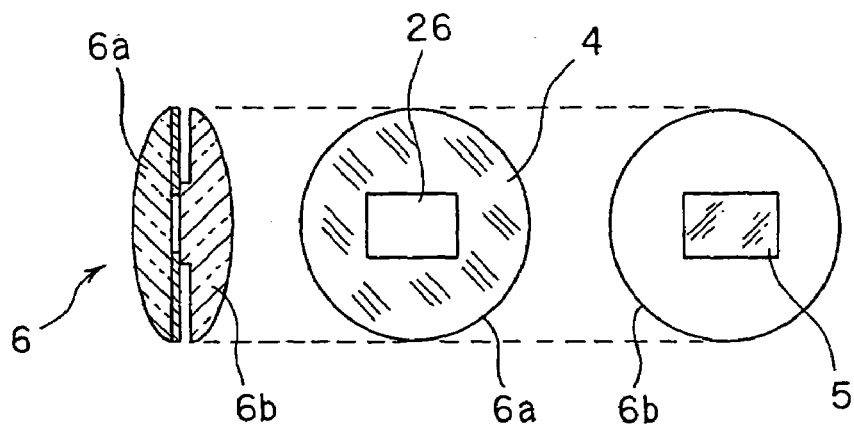

Also, the relay lens block 6 may be formed by attaching the reflector 4 having the rectangular opening formed therein to the one relay lens 6*a*, attaching the rectangular reflection type polarization selecting element 5 to the center of the other relay lens 6*b*, and attaching the relay lenses 6*a* and 6*b* to each other with the reflection type polarization selecting element 5 and reflector 4 being sandwiched between the relay lenses 6*a* and 6*b*, as shown in FIG. 19.

Figure 20:
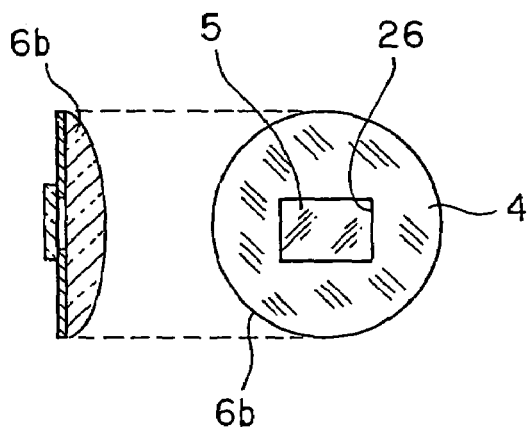

Also, the relay lens block 6 may be formed by attaching the reflector 4 having the rectangular opening formed therein to the other relay lens 6*b*, attaching the rectangular reflection type polarization selecting element 5 to the center of the other relay lens 6*b*, and attaching the one relay lens 6*a* to the other relay lens 6*b* with the reflection type polarization selecting element 5 and reflector 4 being sandwiched between the relay lenses 6*a* and 6*b*, as shown in FIG. 20.

Figure 21:
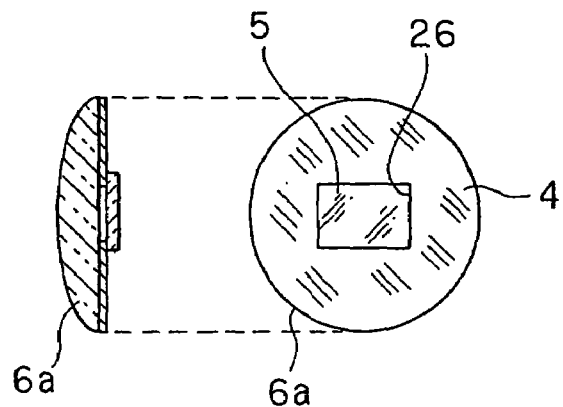

Also, the relay lens block 6 may be formed by attaching the reflector 4 having the rectangular opening formed therein to the one relay lens 6*a*, attaching the rectangular reflection type polarization selecting element 5 to the center of the one relay lens 6*a*, and attaching the other relay lens 6*b* to the one relay lens 6*a* with the reflection type polarization selecting element 5 and reflector 4 being sandwiched between the relay lenses 6*a* and 6*b*, as shown in FIG. 21.

Figure 22:
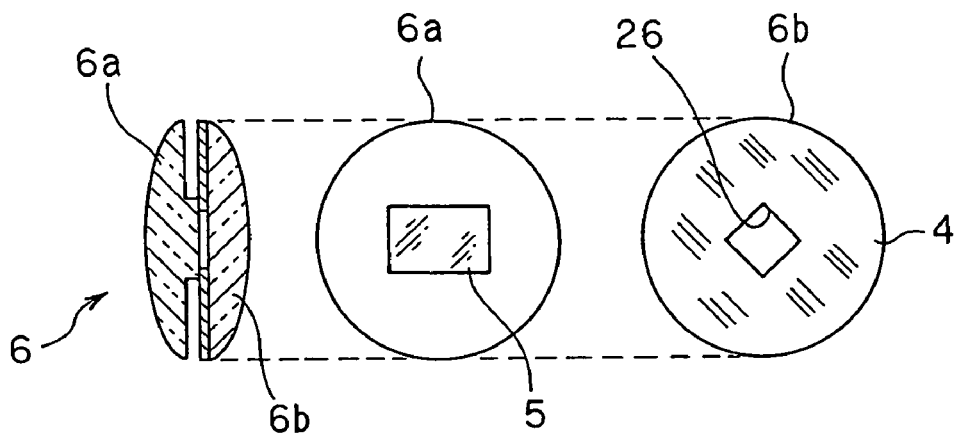

Also, the relay lens block 6 may be formed by attaching the rectangular polarization selecting element 5 to the center of the one relay lens 6*a*, attaching a reflector 4 having an oblique-rectangular opening formed therein to the other relay lens 6*b*, and attaching the relay lenses 6*a* and 6*b* to each other with the reflection type polarization selecting element 5 and reflector 4 being sandwiched between the relay lenses 6*a* and 6*b*, as shown in FIG. 22.

Figure 23:
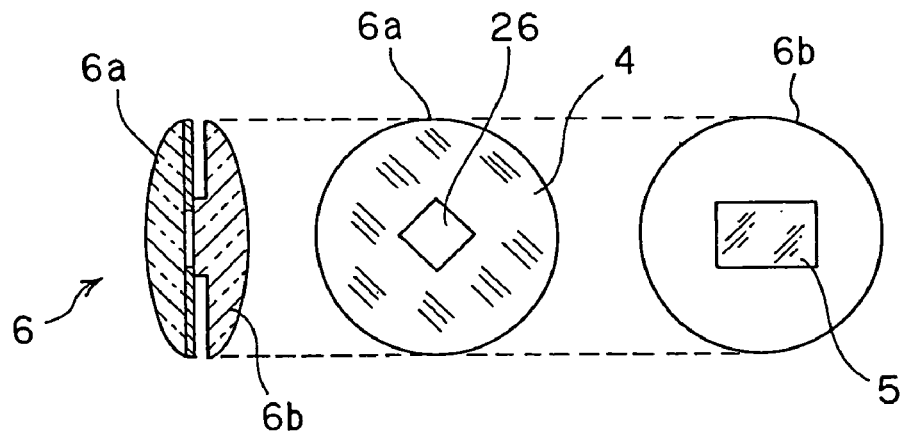

Also, the relay lens block 6 may be formed by attaching the reflector 4 having the oblique-rectangular opening formed therein to the one relay lens 6*a*, attaching the rectangular reflection type polarization selecting element 5 to the center of the other relay lens 6*b*, and attaching the relay lenses 6*a* and 6*b* to each other with the reflection type polarization selecting element 5 and reflector 4 being sandwiched between the relay lenses 6*a* and 6*b*, as shown in FIG. 23.

Figure 24:
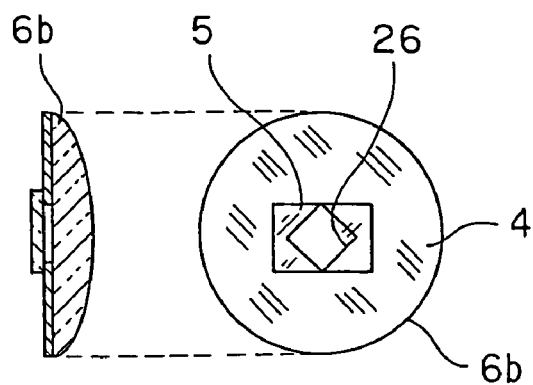

Also, the relay lens block 6 may be formed by attaching the reflector 4 having the oblique-rectangular opening formed therein to the other relay lens 6*b*, attaching the rectangular reflection type polarization selecting element 5 to the center of the other relay lens 6*b*, and attaching the one relay lens 6*a* to the other relay lens 6*b* with the reflection type polarization selecting element 5 and reflector 4 being sandwiched between the relay lenses 6*a* and 6*b*, as shown in FIG. 24.

Figure 25:
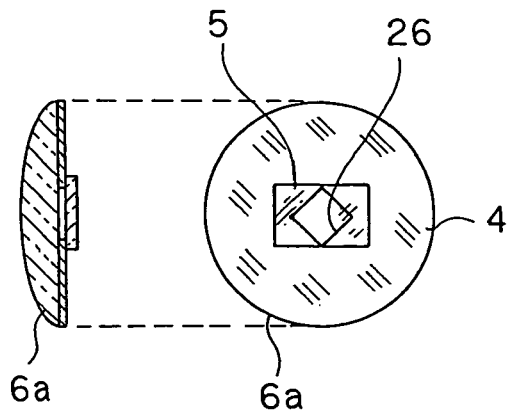

Also, the relay lens block 6 may be formed by attaching the reflector 4 having the oblique-rectangular opening formed therein to the one relay lens 6a, attaching the rectangular reflection type polarization selecting element 5 to the center of the one relay lens 6a, and attaching the other relay lens 6b to the one relay lens 6a with the reflection type polarization selecting element 5 and reflector 4 being sandwiched between the relay lenses 6a and 6b, as shown in FIG. 25.

Figure 26:
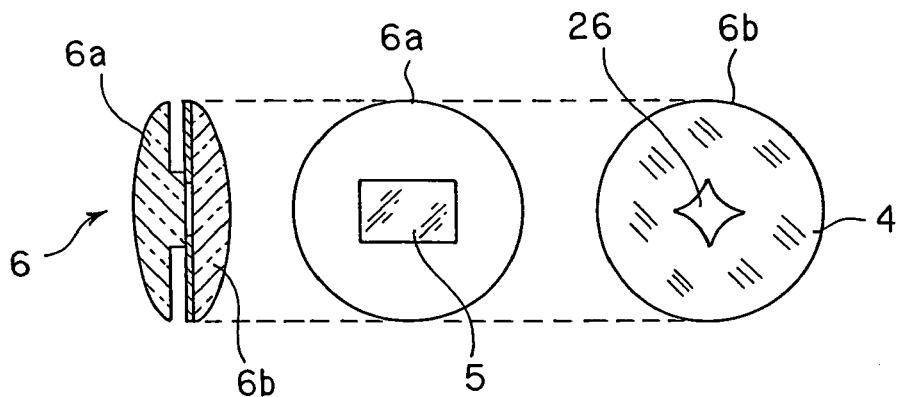

Also, the relay lens block 6 may be formed by attaching the rectangular reflection type polarization selecting element 5 to the center of the one relay lens 6a, attaching a reflector 4 having an oblique, generally rectangular bobbin-shaped opening formed therein to the other relay lens 6b, and attaching the relay lenses 6a and 6b to each other with the reflection type polarization selecting element 5 and reflector 4 being sandwiched between the relay lenses 6a and 6b, as shown in FIG. 26.

Figure 27:
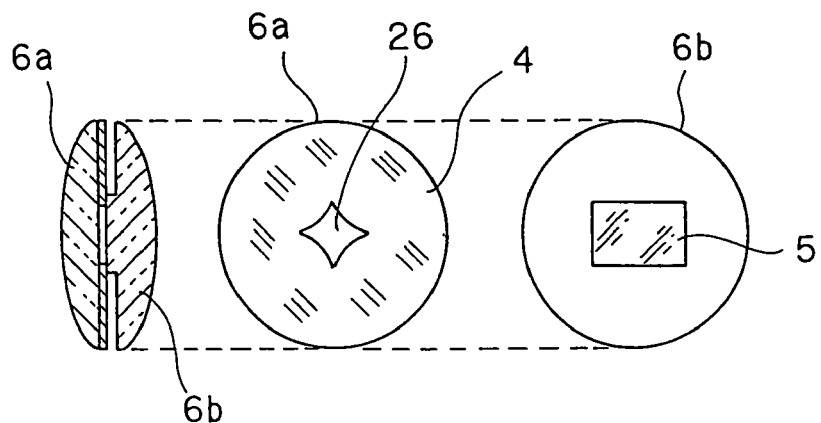

Also, the relay lens block 6 may be formed by attaching the reflector 4 having the oblique, generally rectangular bobbin-shaped opening formed therein (reflective portion formed arcuately convex at the opening) to the one relay lens 6a, attaching the rectangular reflection type polarization selecting element 5 to the center of the other relay lens 6b, and attaching the relay lenses 6a and 6b to each other with the reflection type polarization selecting element 5 and reflector 4 being sandwiched between the relay lenses 6a and 6b, as shown in FIG. 27.

Figure 28:
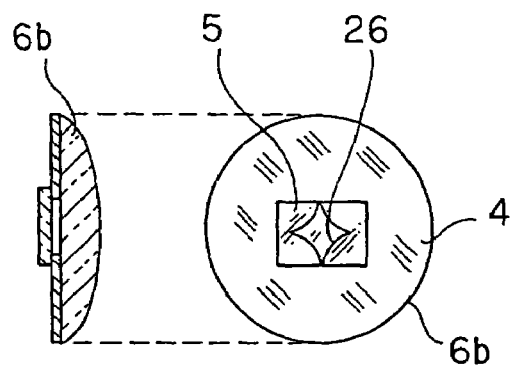

Also, the relay lens block 6 may be formed by attaching the reflector 4 having the oblique, generally rectangular bobbin-shaped opening formed therein to the other relay lens 6b, attaching the rectangular reflection type polarization selecting element 5 to the center of the other relay lens 6b, and attaching the one relay lens 6a to the other relay lens 6b with the reflection type polarization selecting element 5 and reflector 4 being sandwiched between the relay lenses 6a and 6b, as shown in FIG. 28.

Figure 29:
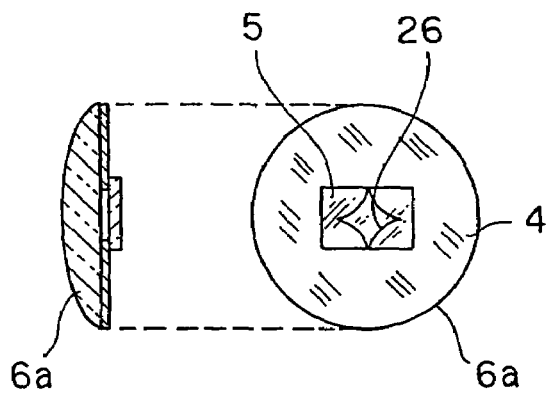

Also, the relay lens block 6 may be formed by attaching the reflector 4 having the oblique, generally rectangular bobbin-shaped opening formed therein to the one relay lens 6a, attaching the rectangular reflection type polarization selecting element 5 to the center of the one relay lens 6a, and attaching the other relay lens 6b to the one relay lens 6a with the reflection type polarization selecting element 5 and reflector 4 being sandwiched between the relay lenses 6a and 6b, as shown in FIG. 29.

Figure 30:
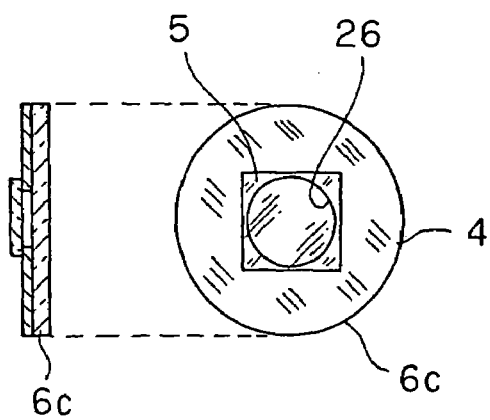

Further, the relay lens block 6 may be formed by attaching the reflector 4 having the circular opening formed therein at the light-source side of a circular flat plate 6c separate from the relay lenses, attaching the rectangular reflection type polarization selecting element 5 to the center of the flat plate 6c, and attaching the relay lenses 6a and 6b to each other with the flat plate 5 being sandwiched between the relay lenses 6a and 6b, as shown in FIG. 30.

Figure 31:
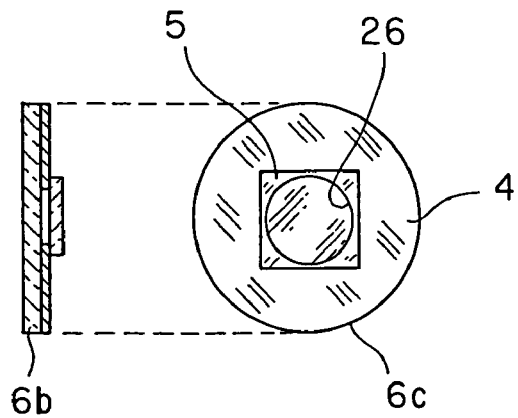

Also, the relay lens block 6 may be formed by attaching a reflector 4 having a circular opening formed therein at the side thereof opposite to the light-source side of the circular flat plate 6c separate from the relay lenses, attaching the rectangular reflection type polarization selecting element 5 to the center of the flat plate 6c, and attaching the relay lenses 6a and 6b to each other with the flat plate 6c being sandwiched between the relay lenses 6a and 6b, as shown in FIG. 31.

Figure 32:
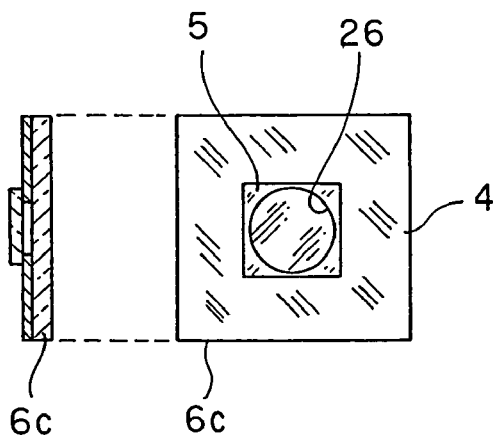

Further, the relay lens block 6 may be formed by attaching the reflector 4 having the circular opening formed therein at the light-source side of the circular flat plate 6c separate from the relay lenses, attaching the rectangular reflection type polarization selecting element 5 to the center of the flat plate 6c, and attaching the relay lenses 6a and 6b to each other with the flat plate 6c being sandwiched between the relay lenses 6a and 6b, as shown in FIG. 32.

Figure 33:
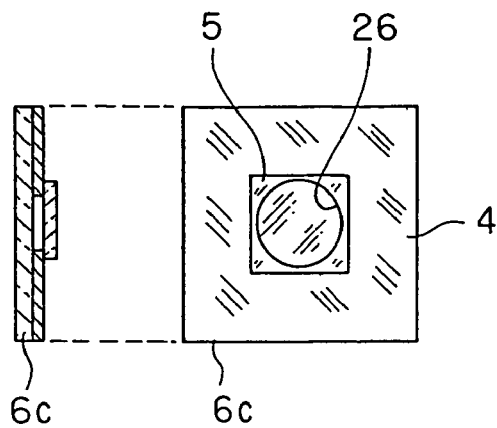

Also, the relay lens block 6 may be formed by attaching the reflector 4 having the circular opening formed therein at the side thereof opposite to the light-source side of the circular flat plate 6c separate from the relay lenses, attaching the rectangular reflection type polarization selecting element 5 to the center of the flat plate 6c, and attaching the relay lenses 6a and 6b to each other with the flat plate 6c being sandwiched between the relay lenses 6a and 6b, as shown in FIG. 33.

In the image display device according to the present invention, when the light pat from the reflection type polarization selecting element 5 to the fly-eye integrators 9 and 10 and that from the fly-eye integrators 9 and 10 to reflection type spatial light modulating elements 14 and 15 are set equal in length to each other, the angle of light at the reflection type polarization selecting element 5 will be nearly coincident with that at the reflection type spatial light modulating elements 14 and 15.

Because of this construction, the reflection type polarization selecting element 5 will function as a polarization plate which makes polarization selection of incident light upon the reflection type spatial light modulating elements 14 and 15, thereby permitting to improve the contrast of the display image. Further, the incident-side polarization can be omitted from the reflection type spatial light modulating elements 14 and 15, which leads to reduced costs of the device components.

In case the focal distance of the relay lens 6b opposite to the fly-eye integrator 9 and that of the field lens 11 are a distance between the first fly-eye integrator 9 and reflector 4 as shown in FIGS. 34A to 34C, the non-uniform illuminance of the recycled light at the time of color reproduction will be noticeable because the light reflected, for recycling, by each reflection type spatial light modulating element will illuminate the same position again. It should be noted that FIGS. 34A, 34B and 34C schematically show the light path from the relay lens 6 to reference mirror 18, light path extending from the relay lens 6 back to the first fly-eye integrator 9, and the light path between the relay lens 6 and first fly-eye integrator, respectively.

To avoid the above non-uniform illuminance, the focal distance of the relay lens 6b opposite to the first fly-eye integrator 9 and that of the field lens 11 can be made different from the distance between the first fly-eye integrator 9 and reflector 4 by appropriately setting the curvature R1, thickness D1 and refractive index n of a lens provided on the reflector 4 or curvature R2 of a lens of the first fly-eye integrator 9, located at the light source 2, and glass plate thickness D2, refractive index, etc. of the first fly-eye integrator 9, as shown in FIGS. 35A to 35C and FIGS. 36A to 36C. In the construction shown in FIG. 35, the focal distance of the relay lens 6b opposite to the first fly-eye integrator 9 is set relatively short. It should be noted that FIGS. 35A, 35B and 35C schematically show the light path from the relay lens 6 to reference mirror 18, light path extending from the relay lens 6 back to the first fly-eye integrator, and the light path between the light path between the relay lens 6 and first fly-eye integrator, respectively.

Figure 36A:
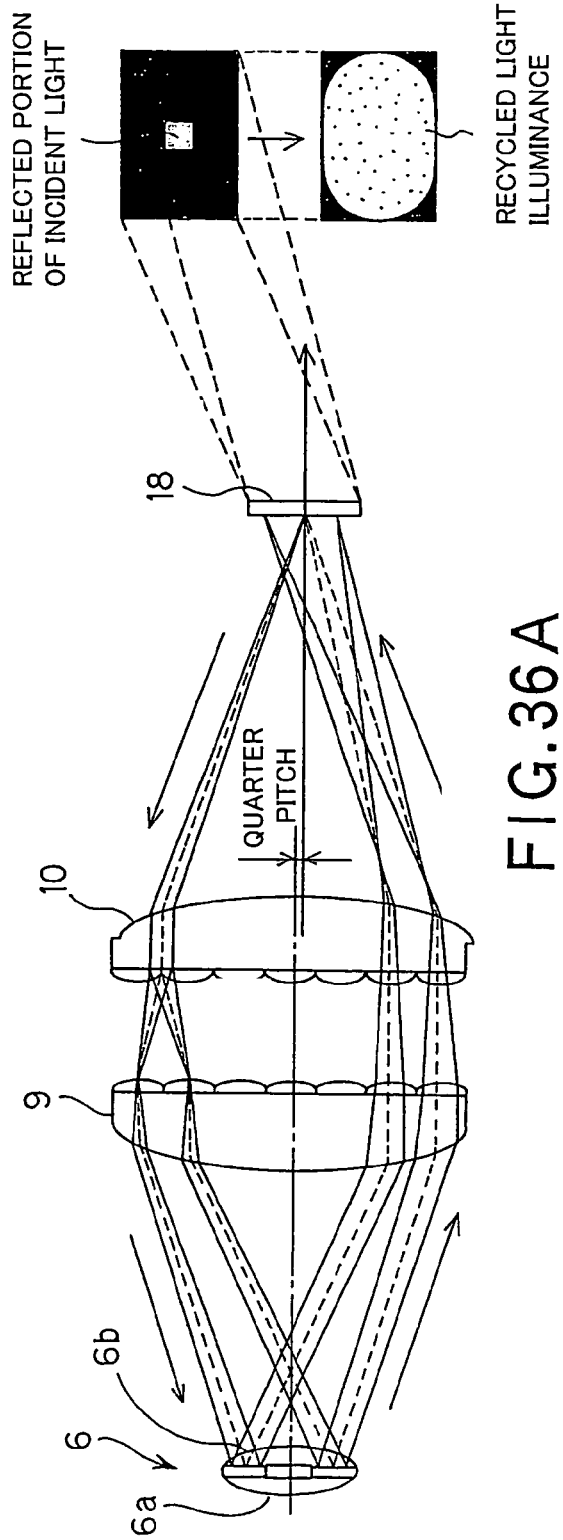
Figure 36C:
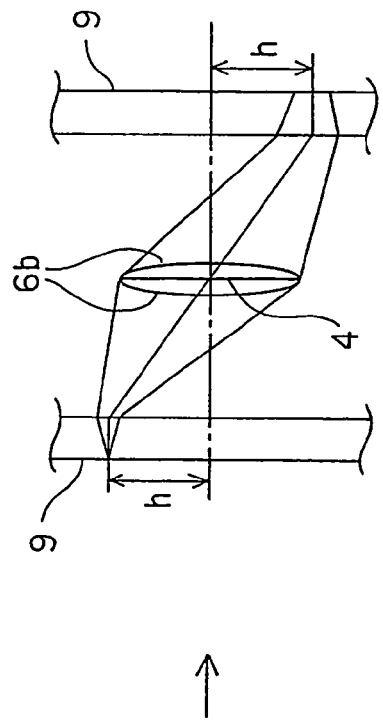
Figure 36B:
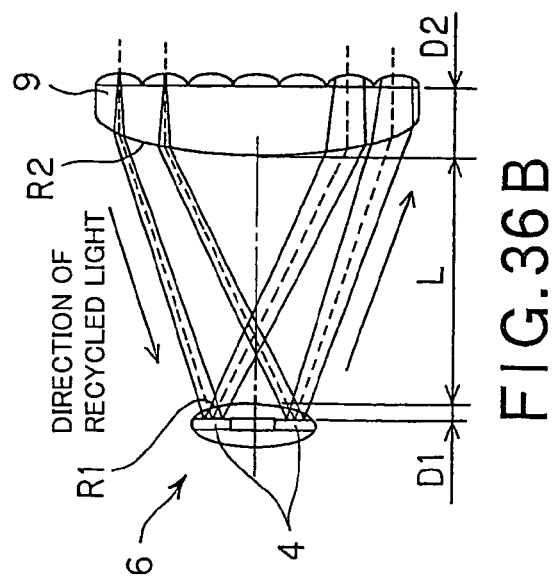

In the construction shown in FIGS. 36A to 36C, the focal distance of the relay lens 6b is set relatively long. Thus, the light, for recycling, by each reflection type spatial light modulating element will illuminate a wider range, whereby the non-uniform illuminance problem can be solved. It should be noted that FIGS. 36A, 36B and 36C schematically show the light path from the relay lens 6 to the reference mirror 18, light path extending from the relay lens 6 back to the first fly-eye integrator, and the light path between the relay lens 6 and first fly-eye integrator, respectively.

Figure 37:
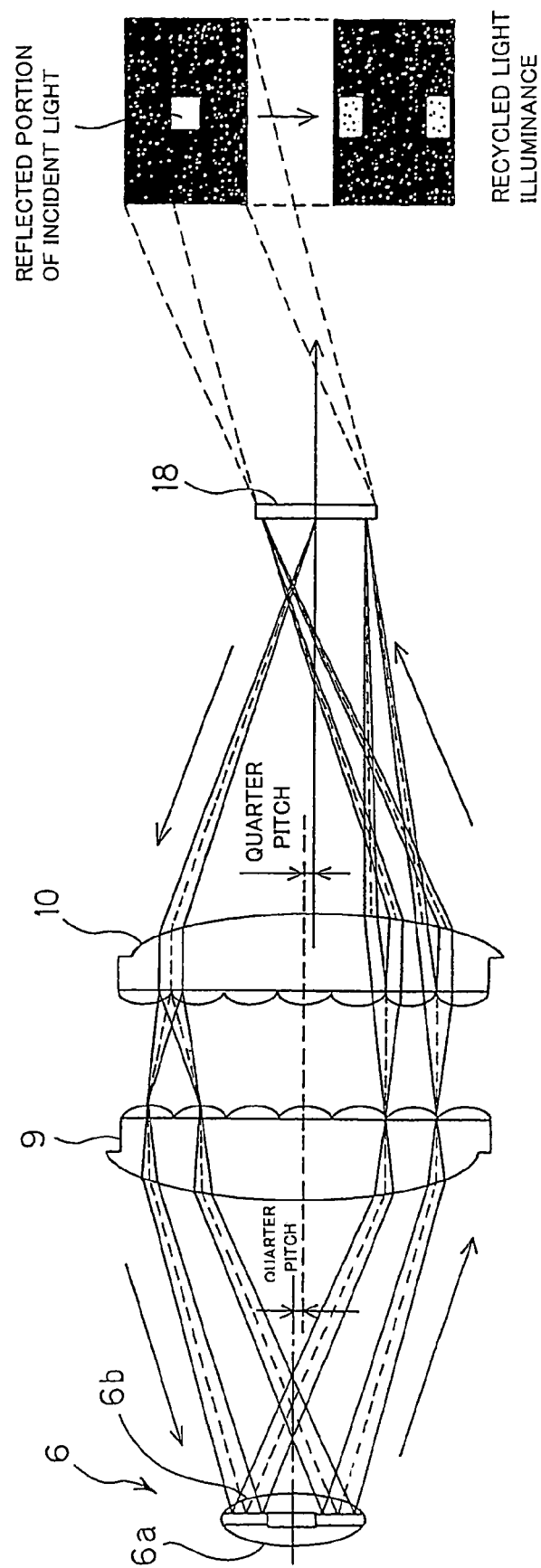
FIG. 37 is a longitudinal sectional view showing an example in which the problem of the nonuniform illumination caused by the recycled light is solved by displacing the fly-eye integrator in one direction.
Figure 38:
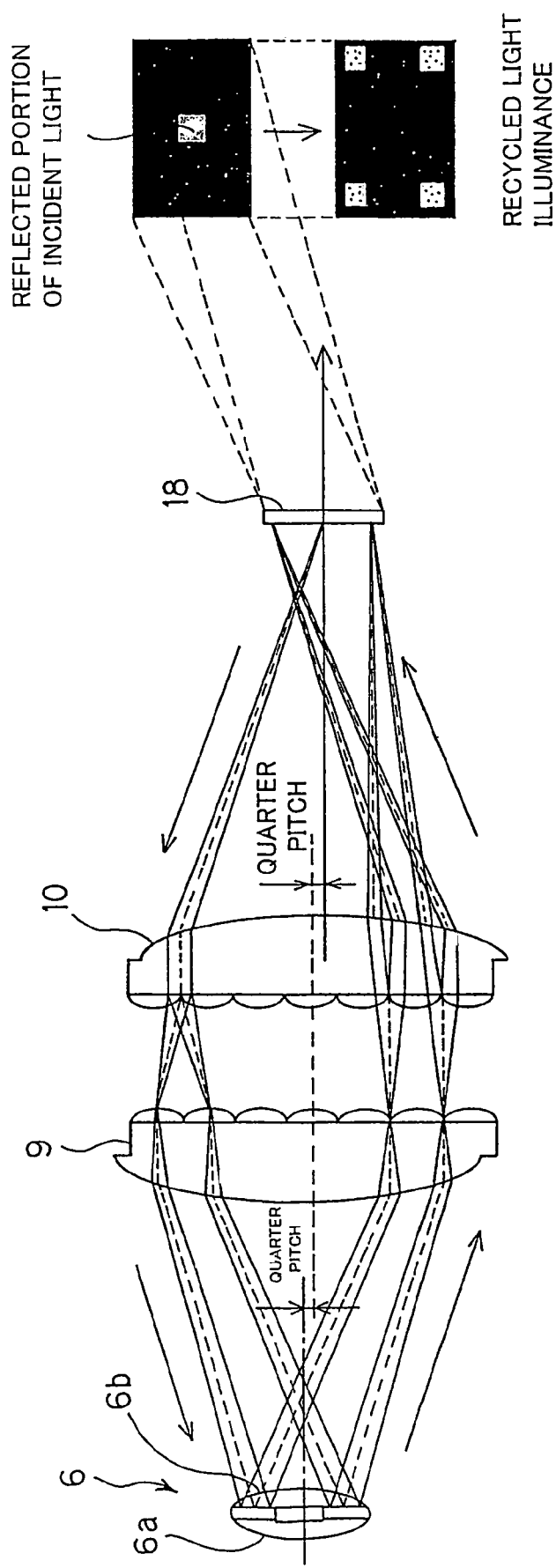
FIG. 38 is a longitudinal sectional view showing an example in which the problem of the nonuniform illumination caused by the recycled light is solved by displacing the fly-eye integrator in two directions.

Also, for incidence of the recycled light from the reflector 4 in the relay lens block 6 upon the first fly-eye integrator 9 again, the recycled light is guided for incidence upon the boundary of the fly-eye lens as shown in FIGS. 37 and 38, whereby it will be split by two or four adjacent fly-eye lenses so that it will illuminate separate positions on each reflection type spatial light modulating element as well. Thus the non-uniform illuminance can be prevented from taking place.

To implement the above illumination, the optical axes of the optical elements laid upstream of the relay lens block 6 may be displaced a quarter of the fly-eye lens pitch from each other and the optical axes of the optical elements laid downstream of the field lens may be displaced a quarter of the fly-eye lens pitch from each other in the opposite direction, as shown in FIGS. 37 and 38. FIG. 37 shows the optical axes of the optical elements laid upstream of the relay lens block 6 being displaced in only the vertical direction, and FIG. 38 shows the optical axes of the optical elements laid downstream of the relay lens block 6 being displaced in both the vertical and horizontal directions.

Figure 39:
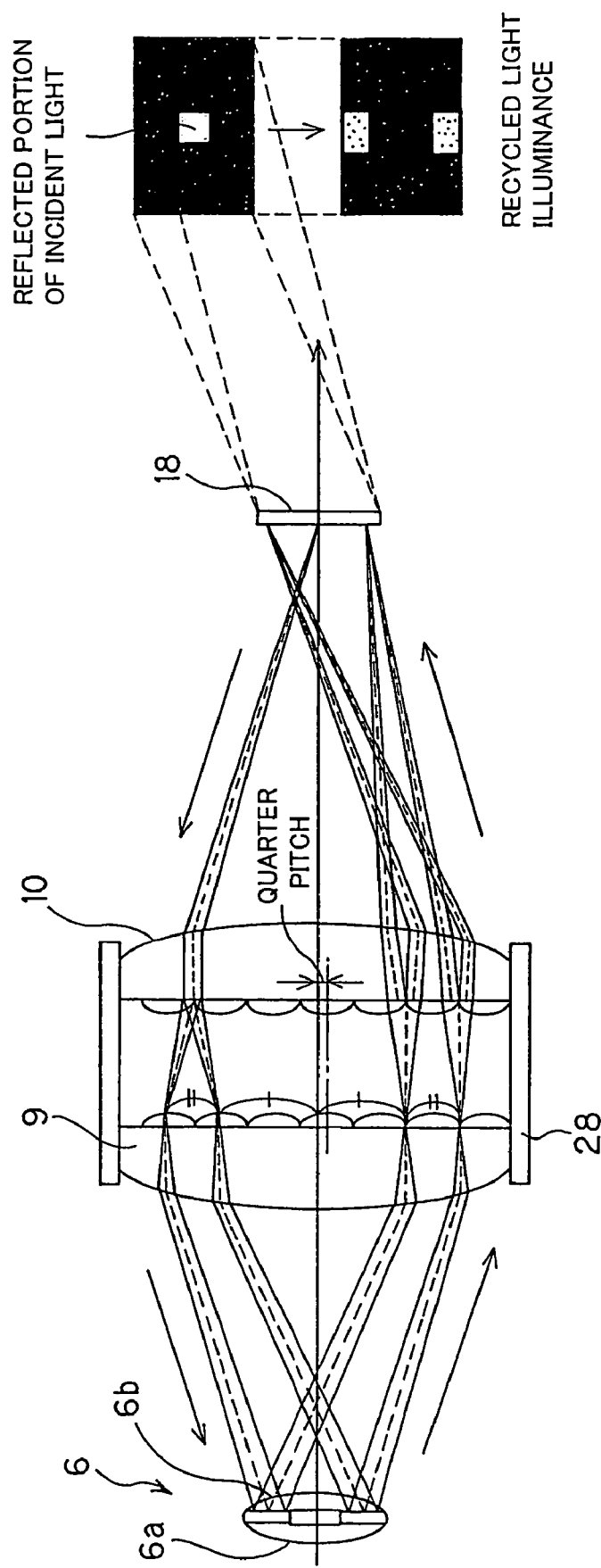
FIG. 39 is a longitudinal sectional view showing an example in which the problem of the nonuniform illumination caused by the recycled light is solved by displacing the fly-eye integrator in one direction.
Figure 40:
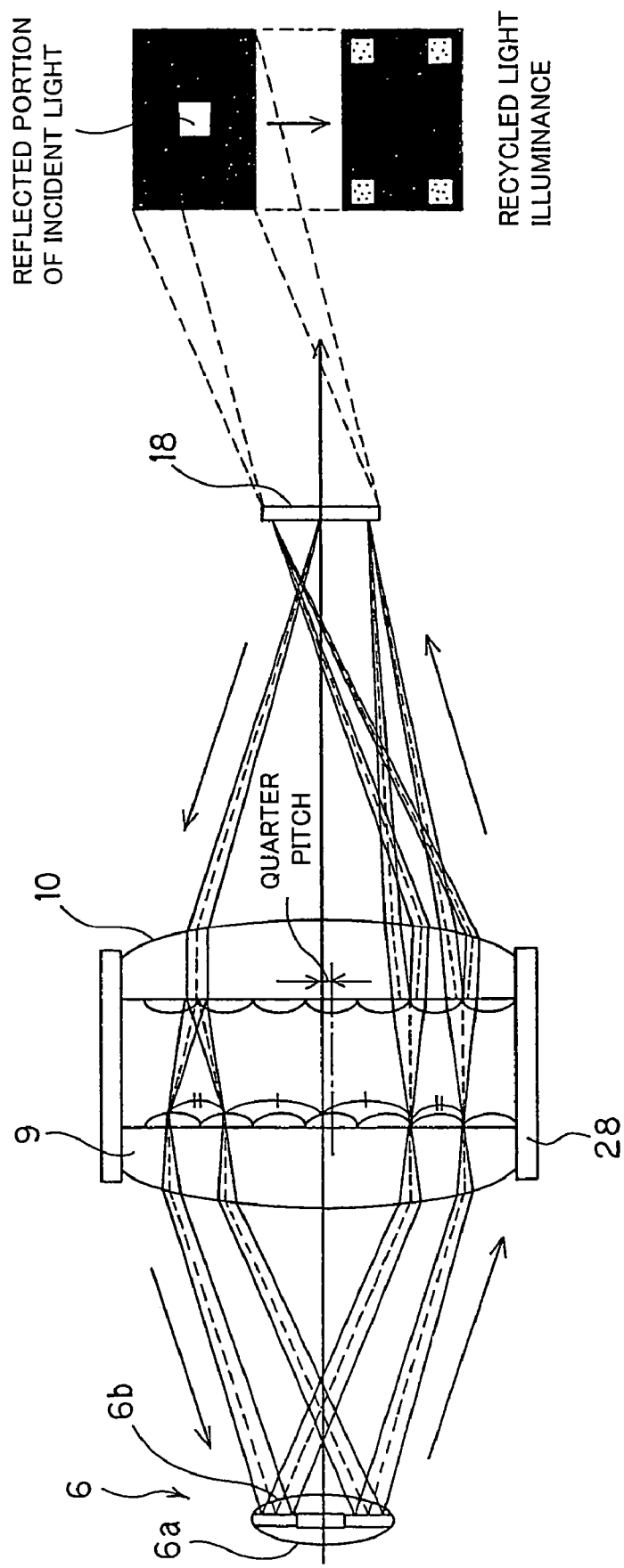
FIG. 40 is a longitudinal sectional view showing an example in which the problem of the nonuniform illumination caused by the recycled light is solved by displacing the fly-eye integrator in two directions.

Also, as in the above embodiment, the position of each of the fly-eye integrators 9 and 10 may be displaced a quarter pitch from the optical axes before and after that position as shown in FIGS. 39 and 40. In case the position of each of the fly-eye integrators 9 and 10 is thus displaced, the optical axes of the optical system before and after the fly-eye integrators 9 and 10 can be made to coincide with each other, which will facilitate the deign and production of the image display device. FIG. 39 shows the position of each of the fly-eye integrators 9 and 10 being displaced in only the vertical direction, and FIG. 40 shows the position of each of the fly-eye integrators 9 and 10 being displaced in both the vertical and horizontal directions.

Further, a construction in which the displacement is made in only one of the short- and long-side directions of each reflection type spatial light modulating element, and also a construction in which the "displacement is made in both the short- and long-side directions", are possible. In the construction in which the "displacement is made in both the short- and long-side directions", the recycled light will be incident upon the boundary the four fly-eye lenses touch at their four corners thereof so that it will be split by the adjacent four fly-eye lenses into four beams which will illuminate the reflection type spatial light modulating elements.

Figure 41:
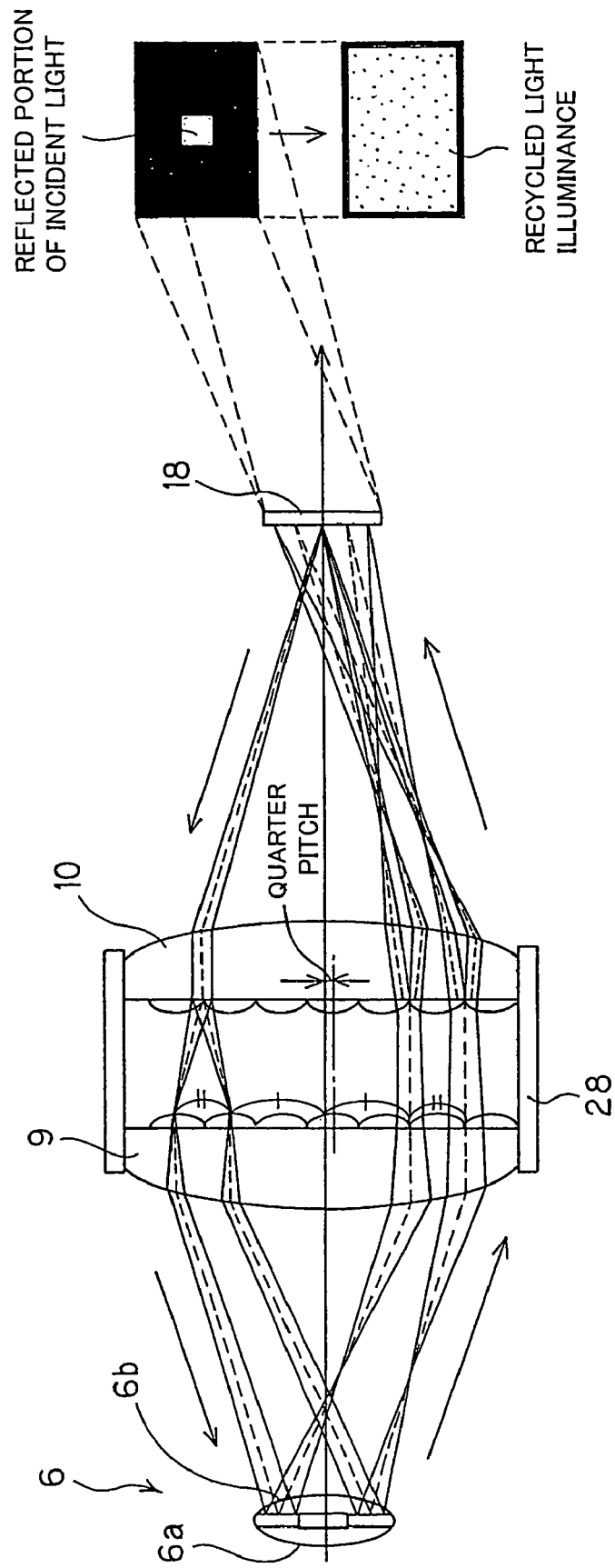
FIG. 41 is a longitudinal sectional view showing an example in which the problem of the nonuniform illuminance caused by the recycled light is solved by decreasing the focal distance of the relay lens.
Figure 42:
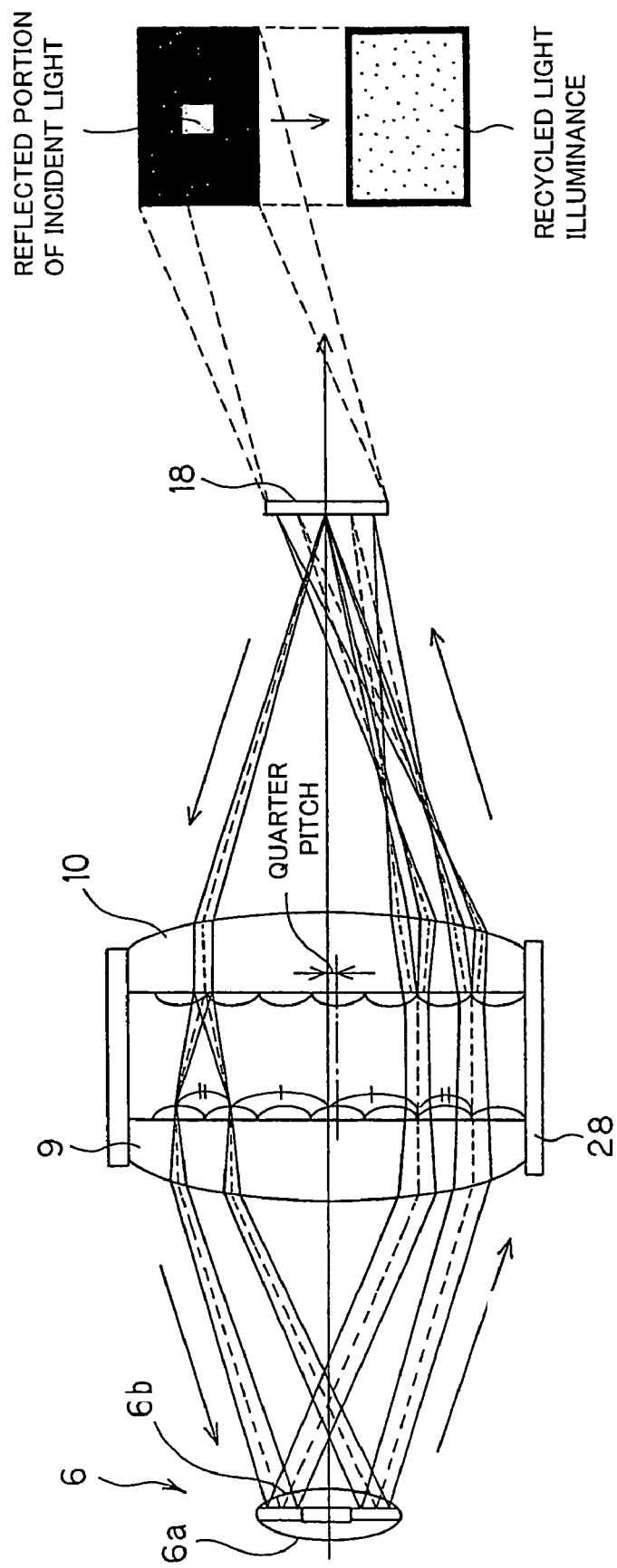
FIG. 42 is a longitudinal sectional view showing an example in which the problem of the nonuniform illuminance caused by the recycled light is solved by increasing the focal distance of the relay lens.

Note that in the image display device, it is possible to make the illuminance of the recycled light more uniform by combining the displacement of the optical elements from their optical axes with the above-mentioned adjustment of the focal distance of the relay lens 6b as shown in FIGS. 41 and 42. FIG. 41 shows a relatively short focal distance of the relay lens 6b opposite to the first fly-eye integrator 9, and FIG. 42 shows a relative long focal distance of the relay lens 6b opposite to the first fly-eye integrator 9.

As above, in the image display device according to the present invention, the fly-eye integrators 9 and 10 are displaced a quarter of the fly-eye lens pitch in a direction perpendicular to the optical axis in order to return the recycled light to the light source.

Figure 43:
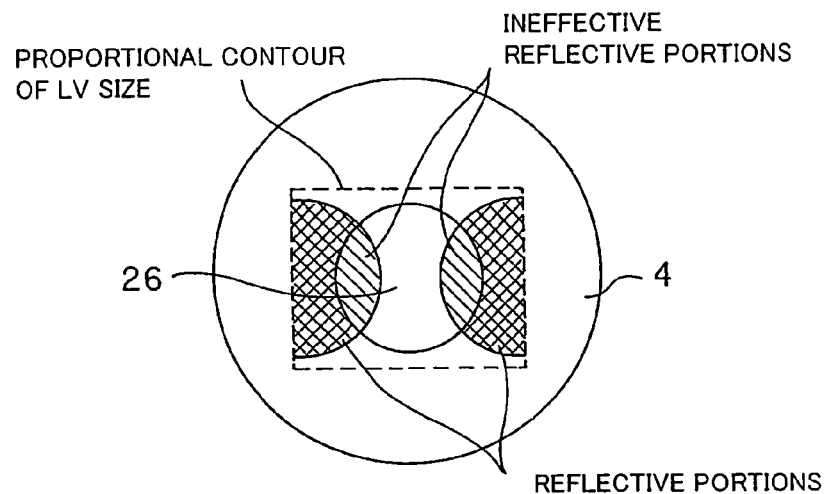
FIG. 43 is a front view showing a first illuminance pattern of the recycled light on the reflector.
Figure 44:
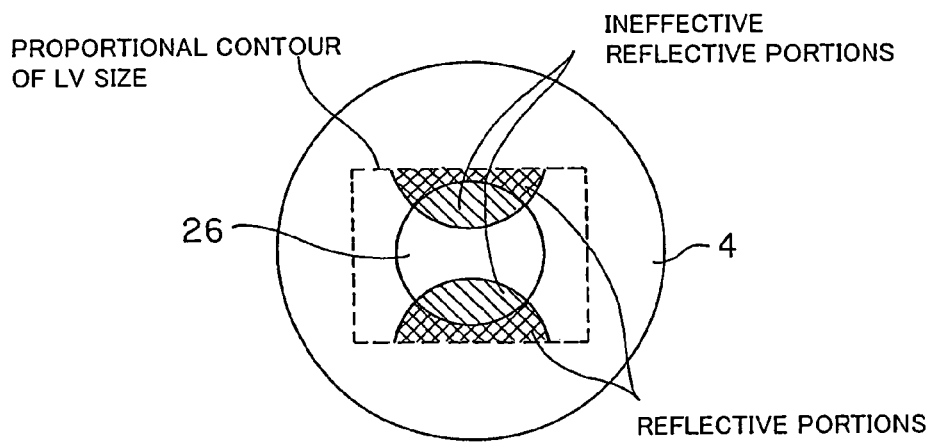
FIG. 44 is a front view of a second illuminance pattern of the recycled light on the reflector.

It is assumed here that the fly-eye integrators 9 and 10 are displaced only in either the direction of the short or long side of the reflection type spatial light modulating element. In this case, the reflector 4 in the relay lens block 6 will cause the recycled light to return to the top and bottom or to the right and left of the opening in the reflector 4, as shown in FIGS. 43 and 44. In this case, a part of the recycled light will return to the light source through the opening again.

Figure 45:
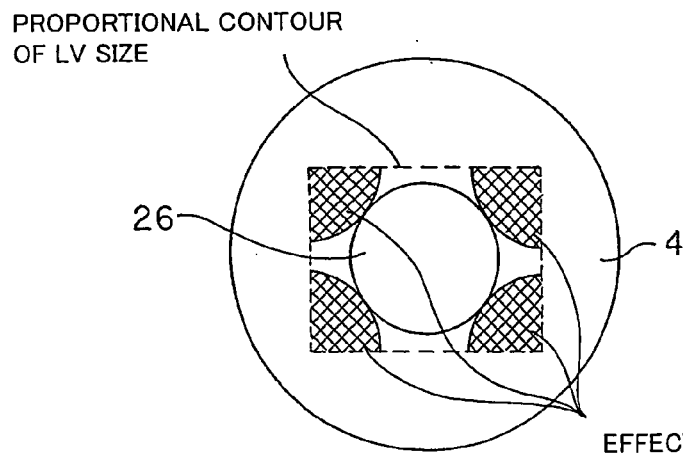
FIG. 45 is a front view of a third illuminance pattern of the recycled light on the reflector.

Also, it is assumed here that the fly-eye integrators 9 and 10 are displaced in both the directions of the short and long sides of the reflection type spatial light modulating element. In this case, the reflector 4 in the relay lens block 6 will cause the recycled light to return to the upper right, lower right, upper left and lower left of the opening in the reflector 4, as shown in FIG. 45. In this case, since the recycled light will be incident upon the reflector 4 with a higher efficiency, so it will definitely be separated from the light traveling along the going path and only an extremely small amount thereof will return to the light source through the opening.

As above, the displacement of the fly-eye integrators 9 and 10 in both the directions of the short and long sides of the reflection type spatial light modulating elements permits to utilize the light with a higher efficiency.

In case the fly-eye integrators 9 and 10 have their fly-eye lens surfaces and lenses formed integrally with each other to be opposite to each other, it is possible to assemble the optical system in the image display device more precisely.

Note that the integral forming of the fly-eye lens surfaces and lenses will suppress the surface reflection of the recycled light and permit to utilize the illumination light with a higher efficiency.

In case each fly-eye lens surface is formed a predetermined distance off the optical axis with reference to the contours of the fly-eye integrators 9 and 10, the fly-eye lens surfaces can be positioned the predetermined distance off the optical axis by assembling the fly-eye integrators 9 and 10 with the contours being taken as a reference. Thus, the fly-eye integrators 9 and 10 can be assembled to each other more easily.

Figure 46:
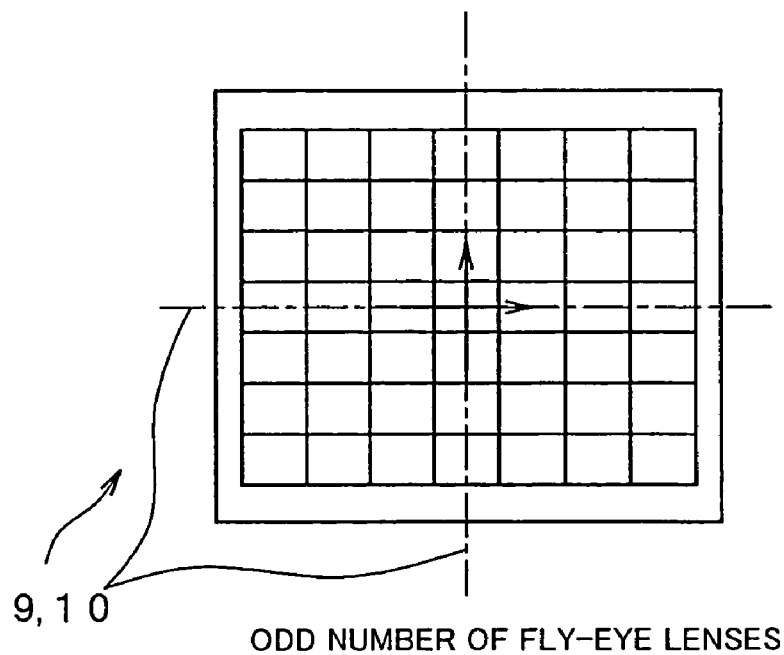
FIG. 46 is a front view of the normal fly-eye integrator (in which an odd number of fly-eye lenses is disposed).
Figure 47:
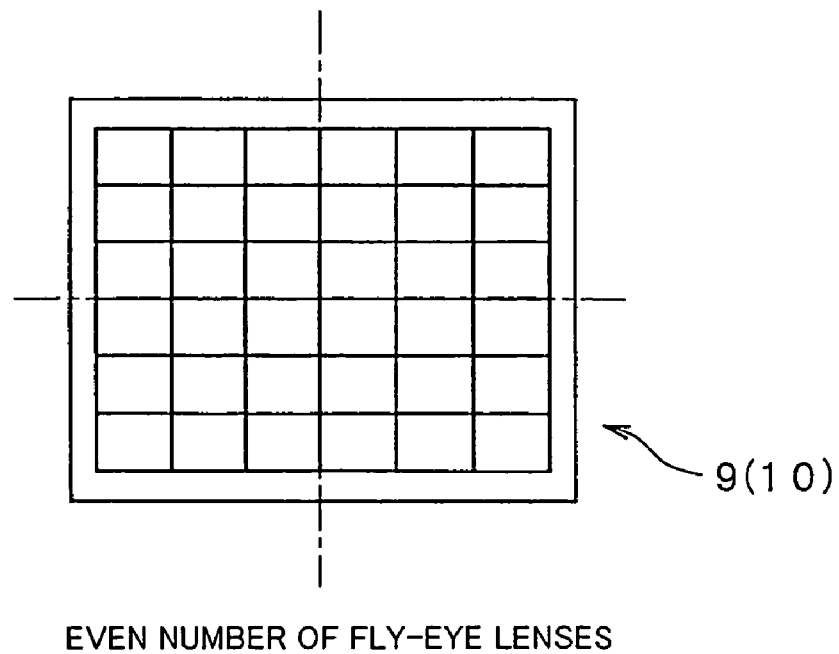
FIG. 47 is a front view of the normal fly-eye integrator (in which an even number of fly-eye lenses is disposed).

That is, in a common fly-eye integrator, the fly-eye lens surfaces are formed in positions, respectively, symmetrical with respect to the contour of the fly-eye integrator as will be seen in FIGS. 46 and 47. FIG. 46 shows an odd number of fly-eye lenses, and FIG. 47 shows an even number of fly-eye lenses.

Figure 48:
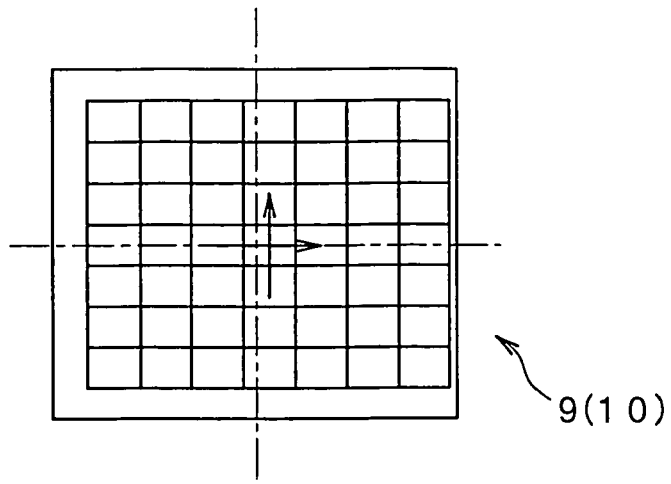
FIG. 48 is a front view of the fly-eye integrator displaced a quarter pitch horizontally.
Figure 49:
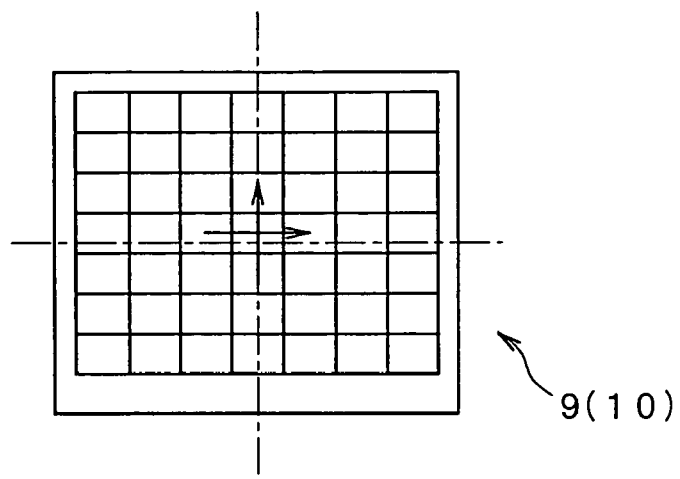
FIG. 49 is a front view of the fly-eye integrator displaced a quarter pitch vertically.
Figure 50:
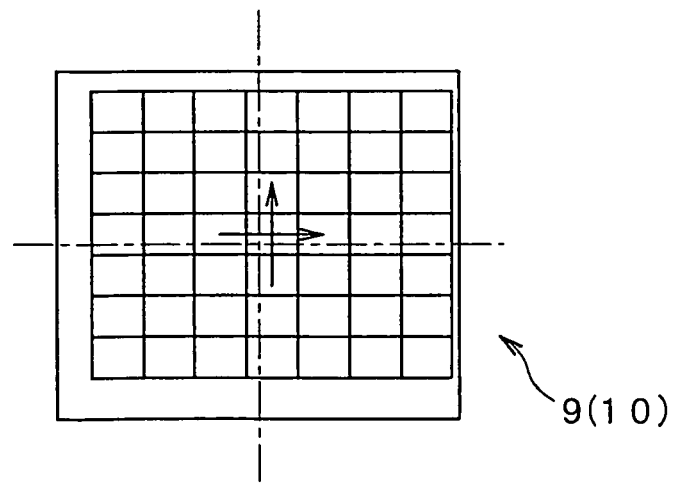
FIG. 50 is a front view of the fly-eye integrator displaced a quarter pitch horizontally and vertically.

As shown in FIGS. 48, 49 and 50, the fly-eye integrators 9 and 10 in this image display device have the fly-eye lens surfaces formed a predetermined distance off the contour of the fly-eye integrators 9 and 10. FIG. 48 shows a fly-eye lens surface displayed in the direction of the long side (horizontal) of the reflection type spatial light modulating element, FIG. 49 shows a fly-eye lens surface displayed in the direction of the short side (vertical) of the reflection type spatial light modulating element, and FIG. 50 shows a fly-eye lens surface displayed in both the directions of the long side (horizontal) and short side (vertical) of the reflection type spatial light modulating element.

In this image display device, the first and second fly-eye integrators 9 and 10 are disposed with their respective fly-eye lens surfaces laid opposite to each other. Therefore, the first and second fly-eye integrators 9 and 10 are formed with their contours being coaxial with each other and fly-eye lens surfaces laid opposite to each other so that the fly-eye lens surface will be spatially displaced in one direction.

Figure 51:
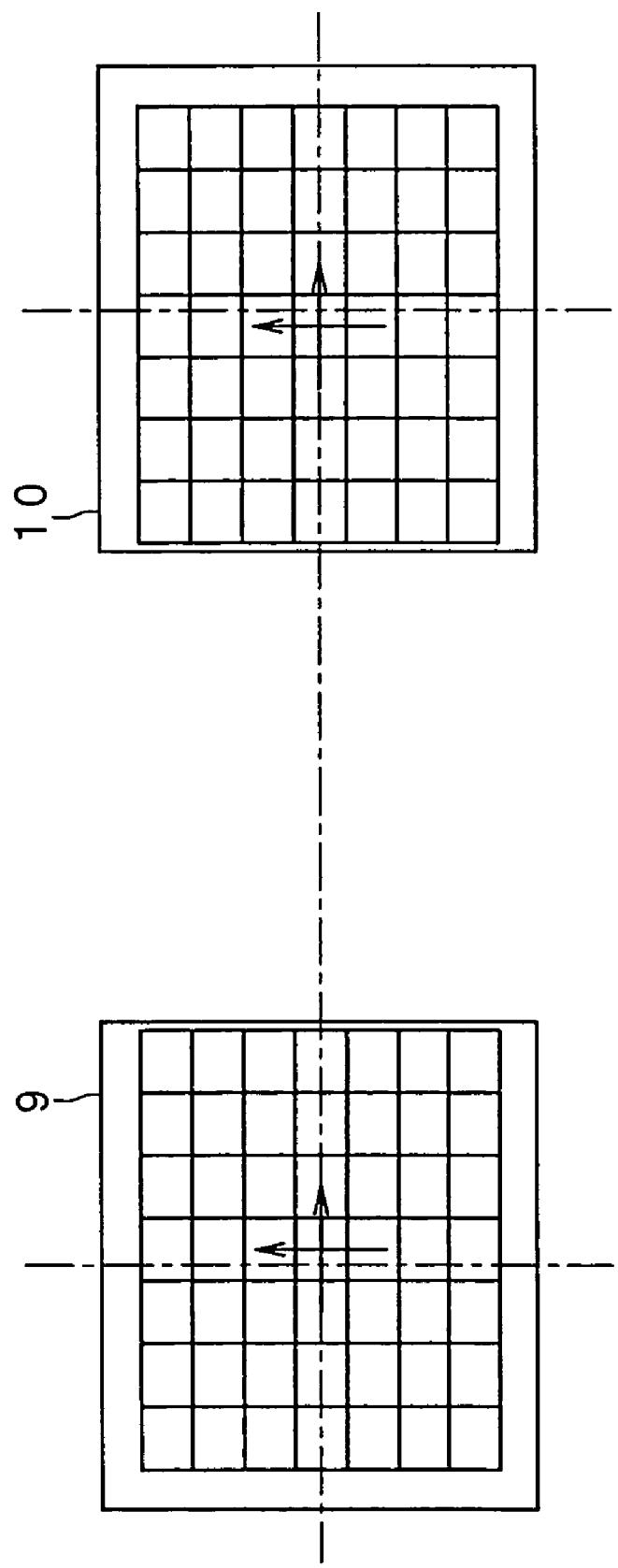
FIG. 51 is a front view showing a correspondence between first and second fly-eye integrators, each displaced a quarter pitch horizontally.

More specifically, in case the fly-eye lens surfaces are displaced in the direction of the long side (horizontal) of the reflection type spatial light modulating element, the fly-eye lens surface of the first fly-eye integrator 9 is displaced in one direction in relation to the first fly-eye integrator contour 9 while that of the second fly-eye integrator 10 is displaced in the other direction in relation to the contour of the other fly-eye integrator 10, as shown in FIG. 51.

Figure 52:
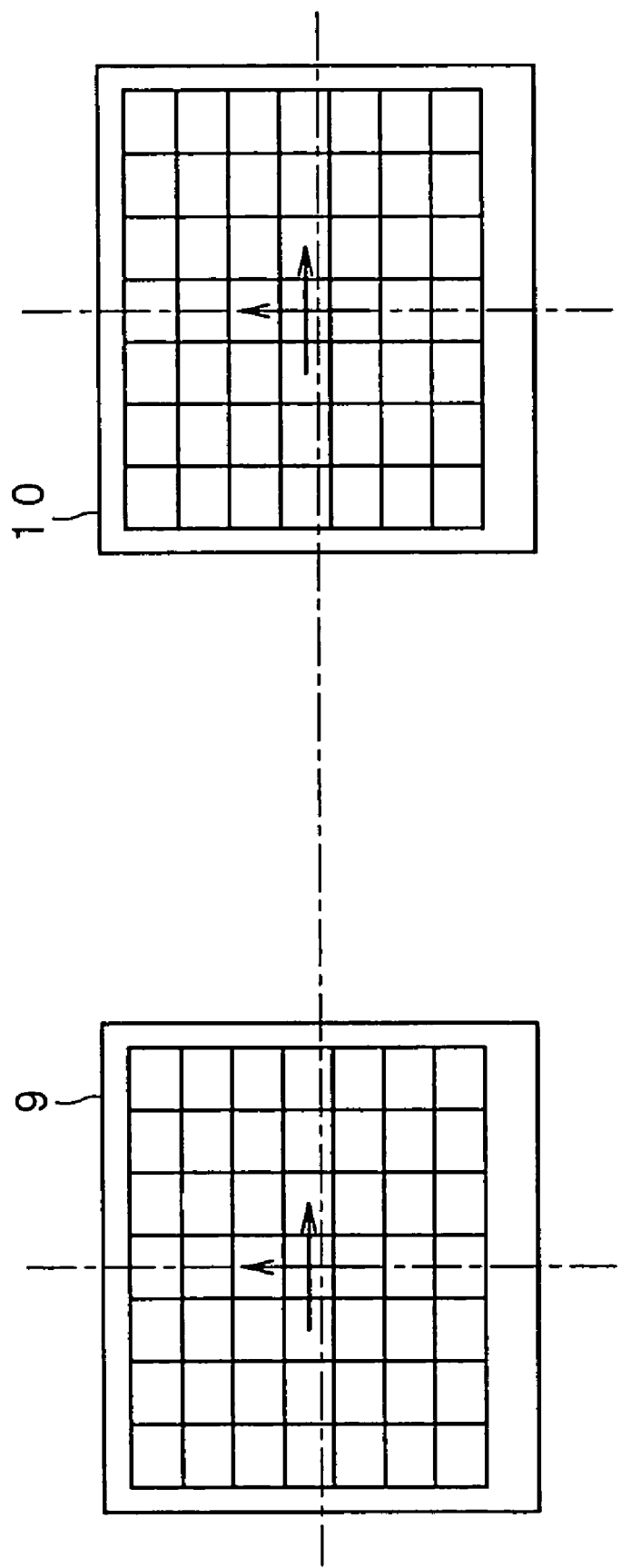
FIG. 52 is a front view showing a correspondence between the first and second fly-eye integrators displaced a quarter pitch vertically.

Similarly, in case the fly-eye lens surfaces are displaced in the direction of the short side (vertical) of the reflection type spatial light modulating element, the fly-eye lens surface of the first fly-eye integrator 9 is displaced toward the top or bottom of the contour and also that of the second fly-eye integrator 10 is displaced toward the top or bottom of the contour, as shown in FIG. 52.

Figure 53:
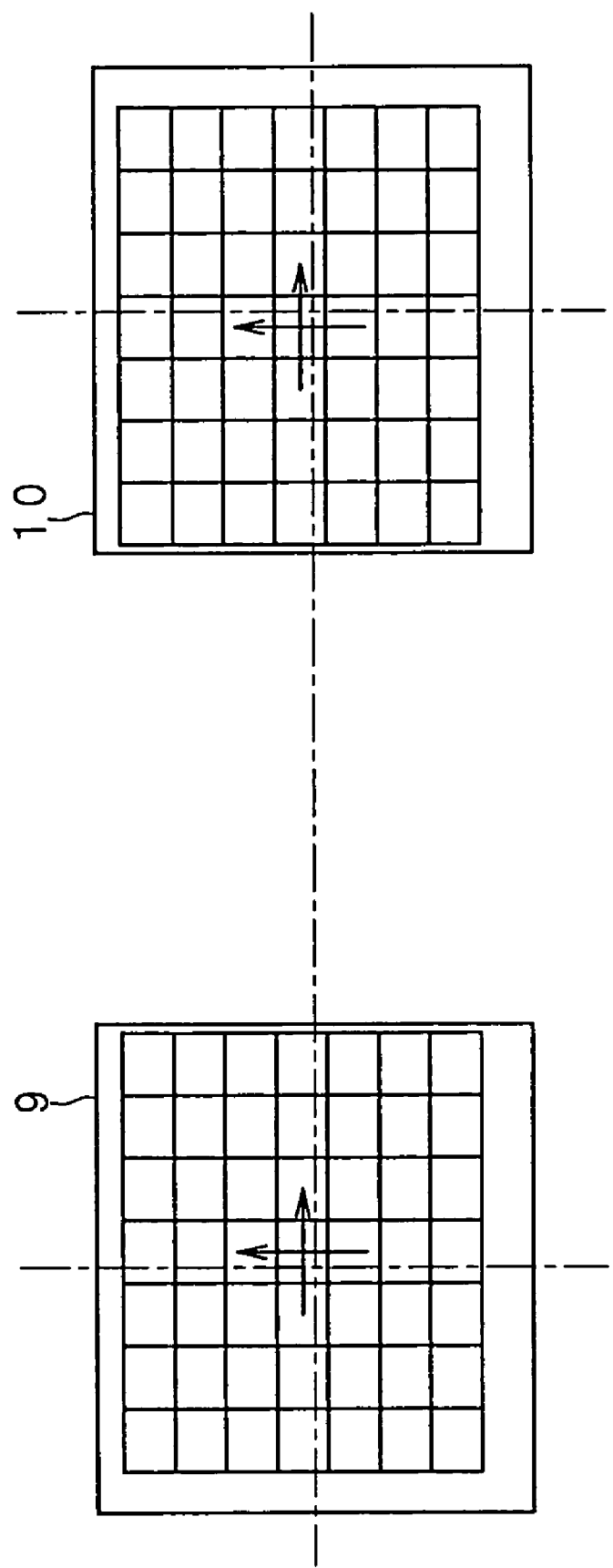
FIG. 53 is a front view showing a correspondence between the first and second fly-eye integrators, each displaced a quarter pitch horizontally and vertically.

Moreover, in case the fly-eye lens surfaces are displaced in both the directions of the long side (horizontal) and short side (vertical) of the reflection type spatial light modulating element, the fly-eye lens surface of the first fly-eye integrator 9 is displaced toward the top (or bottom) of the contour at one side while that of the second fly-eye integrator 10 is displaced toward the top (or bottom) of the contour at the other side, as shown in FIG. 53.

Figure 54:
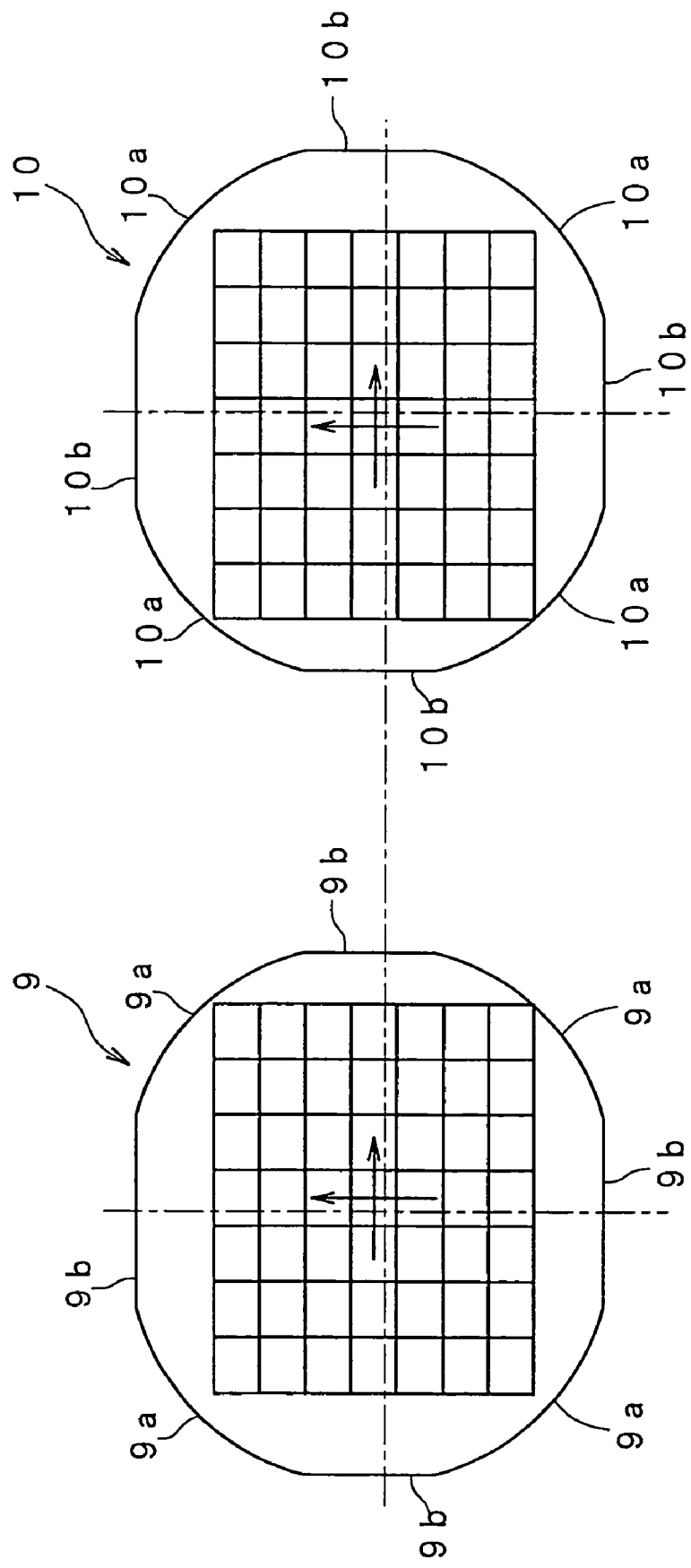
FIG. 54 is a front view showing the contours of the first and second fly-eye integrators, each displaced a quarter pitch horizontally and vertically.

Further, in these fly-eye integrators 9 and 10, a positioning portion is formed which includes cylindrical surface portions (round surface) 9a (10a) for axial alignment and flat surface portions 9b (10b) for positioning (detent) in a direction of rotation about the axis, the cylindrical surface portions 9a (10b) and flat surface portions 9b (10b) being formed along the contour of the fly-eye integrator 9 (10), as shown in FIG. 54. The cylindrical surface portions 9a and 10a and flat surface portions 9b and 10b are formed in four directions of the contours of the first and second fly-eye integrators 9 and 10.

As shown in FIGS. 55A to 55D, the fly-eye integrators 9 and 10 are positioned in relation to each other and held by a holding member 28 in a lens-barrel 27 of the image display device. FIG. 55A is a longitudinal sectional view of a portion of the lens-barrel 27 extending from the light source 2 to the projection lens 17, FIG. 55B is a front view of only the lens-barrel portion in FIG. 55A, FIG. 55C is a perspective view of only a portion of the lens-barrel at the light source side, FIG. 55D is a perspective view of the holding member, and FIG. 55E is a perspective view of only a portion of the lens-barrel at the projection lens side.

Figure 56:
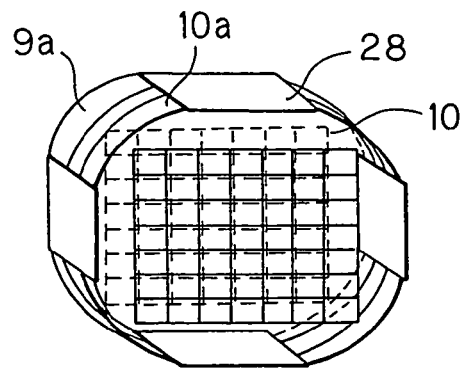
FIG. 56 is a perspective view of the fly-eye integrator and holder.

More specifically, the holding member 28 is formed generally annular. As shown in FIG. 56, it is attached to the first fly-eye integrator 9 while holding the flat surface portion 9b of the first fly-eye integrator 9 with its tongue-shaped portions 28a provided at four places Also, the holding member 28 is also attached to the second fly-eye integrator 10 while holding the flat portion 10b of the second fly-eye integrator 10 with the four tongue-shaped portions 28a. In this condition, the fly-eye integrators 9 and 10 are positioned by one holding member 28 with reference to the flat surface portions 9b and 10b, have their contours set coaxially with each other, and are opposite to each other with their fly-eye lens surfaces laid parallel to each other while being restricted from rotation about the axis. At this time, the fly-eye lens surfaces of the fly-eye integrators 9 and 10 are in a predetermined physical relation with each other.

Figure 57:
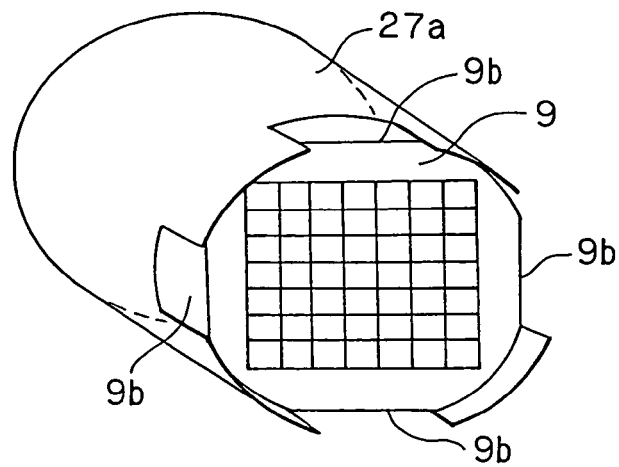
FIG. 57 is a perspective view of the fly-eye integrator, holder and light source-side lens-barrel portion.
Figure 58:
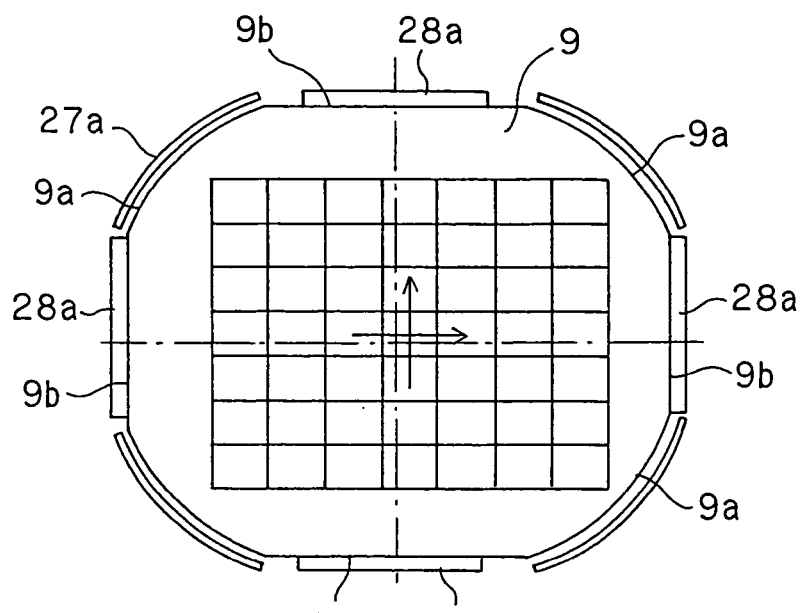
FIG. 58 is a front view showing the fitting between the first fly-eye integrator, holder and light source-side lens-barrel portion.

As shown in FIGS. 57 and 58, the lens-barrel 27 includes a cylindrical lens-barrel portion 27a provided at the side of the light source 2 and which is fixed to the cylindrical surface portions 9a of the first fly-eye integrator 9 with the tongue-shaped portions at the four front ends. At this time, the light source-side lens-barrel portion 27a is laid coaxially with the contour of the first fly-eye integrator 9. Therefore, when the optical system from the light source 2 to the relay lens block 6 is installed coaxially to the light source-side lens-barrel 27a, it will be held in a predetermined position coaxial with the contour of the first fly-eye integrator 9.

Figure 59:
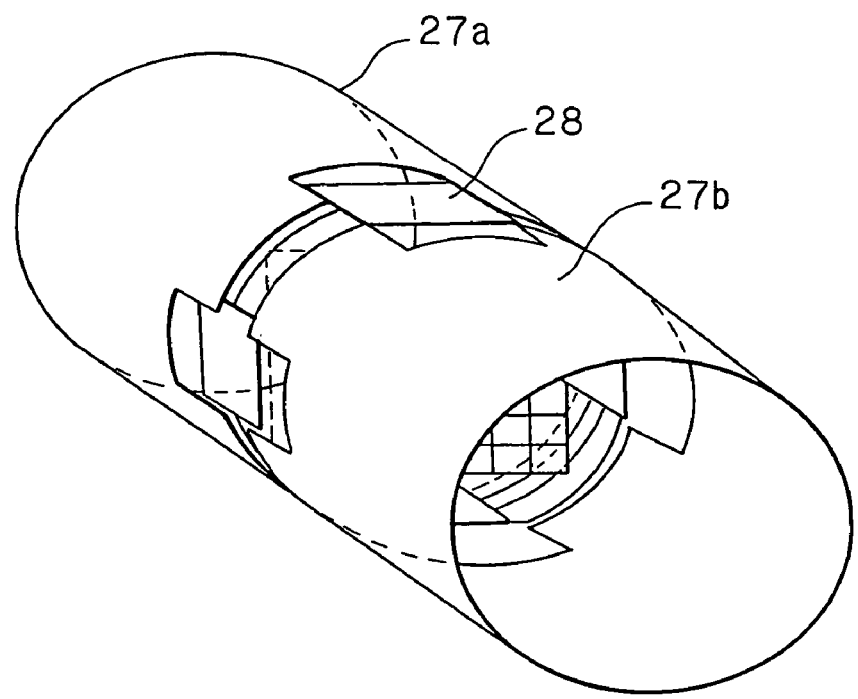
FIG. 59 is a perspective view of the fly-eye integrator, holder, light source-side lens-barrel portion and projection lens-side lens-barrel portion.
Figure 60:
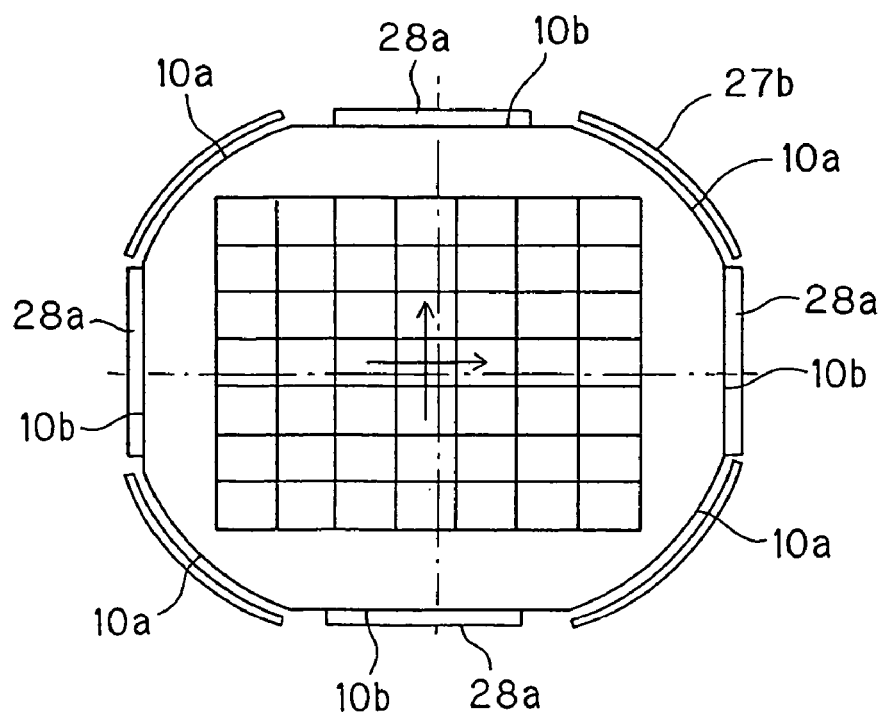
FIG. 60 is a front view showing the fitting between the first fly-eye integrator, holder and projection lens-side lens-barrel portion.

As shown in FIGS. 59 and 60, the lens-barrel 27 includes also a cylindrical lens-barrel portion 27b provided at the side of the projection lens 17 and which is fixed to the cylindrical surface portions 10a of the second fly-eye integrator 10 with the tongue-shaped portions at the four rear ends. At this time, the projection lens-side lens-barrel portion 27b is laid coaxially with the contour of the second fly-eye integrator 10. Therefore, when the optical system from the field lens 11 to the projection lens 17 is installed coaxially to the projection lens-side lens-barrel 27b, it will be held in a predetermined position coaxial with the contour of the second fly-eye integrator 10.

Figure 61:
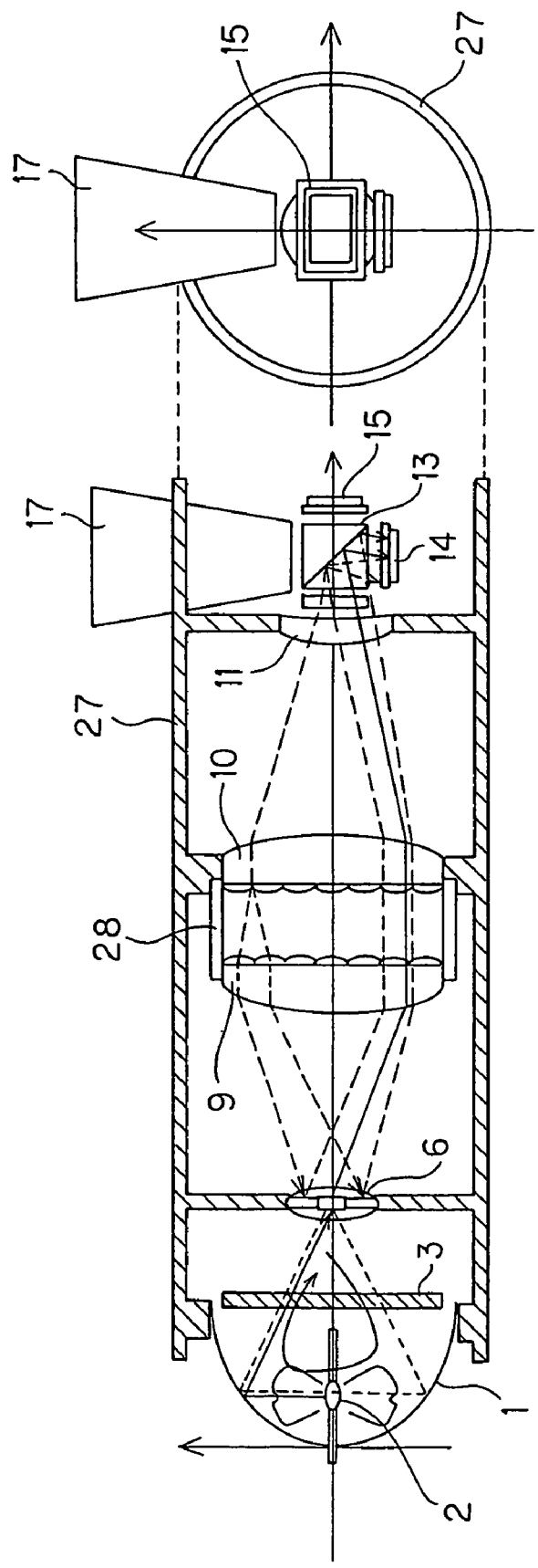
FIG. 61 is a longitudinal sectional view and front view of the lens-barrel having a second construction.

Also in the image display device, the lens-barrel 27 as a whole may be formed as an integral one as shown in FIG. 61. In this case, the holding member 28 is first fixed to the flat surface portions 9b of the first fly-eye integrator 9 with its tongue-shaped pieces 28a at the four places, and also to the holding member 28 at the flat surfaces 10b of the second fly-eye integrator 10. In this condition, the fly-eye integrators 9 and 10 are positioned by the one holding member 28 with reference to the flat surface portions 9b and 10b, have their contours set coaxially with each other, and are opposite to each other with their fly-eye lens surfaces laid parallel to each other while being restricted from rotation about the axis, as above. At this time, the fly-eye lens surfaces of the fly-eye integrators 9 and 10 are in a predetermined physical relation with each other.

Then, the lens-barrel 27 is installed to the cylindrical surface portions 9a of the first fly-eye integrator 9 or to the cylindrical surface portions 10a of the second fly-eye integrator 10. At this time, the lens-barrel 27 is set coaxial with the contour of the first fly-eye integrator 9 or second fly-eye integrator 10. Therefore, when the optical system from the light source 2 to the projection lens 17 is installed coaxially to the lens-barrel 27, it will be held in a predetermined position coaxial with the contours of the first and second fly-eye integrators 9 and 10.

Figure 62:
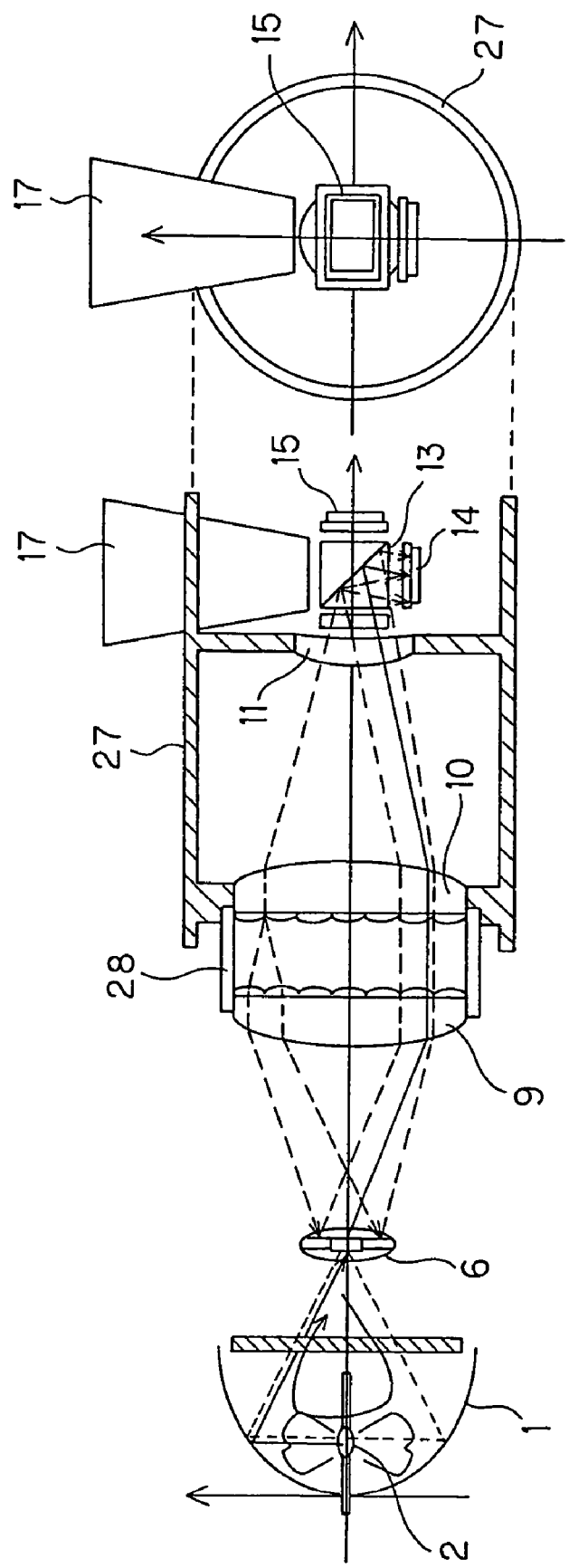
FIG. 62 is a longitudinal sectional view and front view of the lens-barrel having a third construction.

Further in the image display device, the lens-barrel 27 may be formed to house only a portion of the optical system from the fly-eye integrators 9 and 10 to the projection lens 17 as shown in FIG. 62. In this case, the holding member 28 is first fixed to the flat surface portions 9b of the first fly-eye integrator 9 with its tongue-shaped pieces 28a at the four places, and also to the holding member 28 at the flat surfaces 10b of the second fly-eye integrator 10. In this condition, the fly-eye integrators 9 and 10 are positioned by the one holding member 28 with reference to the flat surface portions 9b and 10b, have their contours set coaxially with each other, and are opposite to each other with their fly-eye lens surfaces laid parallel to each other while being restricted from rotation about the axis, as above. At this time, the fly-eye lens surfaces of the fly-eye integrators 9 and 10 are in a predetermined physical relation with each other.

Then, the lens-barrel 27 is fixed to the cylindrical surface portions 10a of the second fly-eye integrator 10. At this time, the lens-barrel 27 is set coaxial with the contour of the second fly-eye integrator 10. Therefore, when the optical system from the field lens 11 to the projection lens 17 is installed coaxially to the lens-barrel 27, it will be held in a predetermined position coaxial with the contours of the first and second fly-eye integrators 9 and 10.

In this case, the optical system from the light source 2 to the relay lens block 6 has to be separately positioned and held in a predetermined position in relation to the fly-eye integrators 9 and 10.

Figure 63:
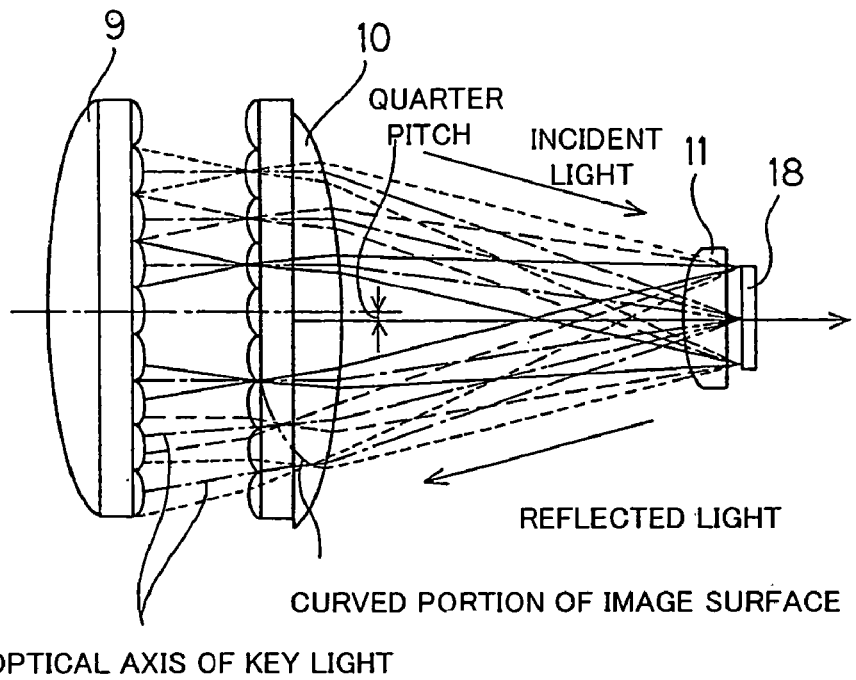
FIG. 63 schematically illustrates the light path, showing how an aberration is caused by the field lens.

In the image display device, in case a common convex-flat lens is used as the field lens 11 as shown in FIG. 63, the image surface of the reference mirror 18 will be curved, which will have an influence on the recycled light returning to the light source, as well. Thus, rays of light, far from the optical axis, of the light returning from the second fly-eye integrator 10 to first fly-eye integrator 9 will be oblique in relation to the key light, which will lower the efficiency of illumination light utilization.

Figure 64:
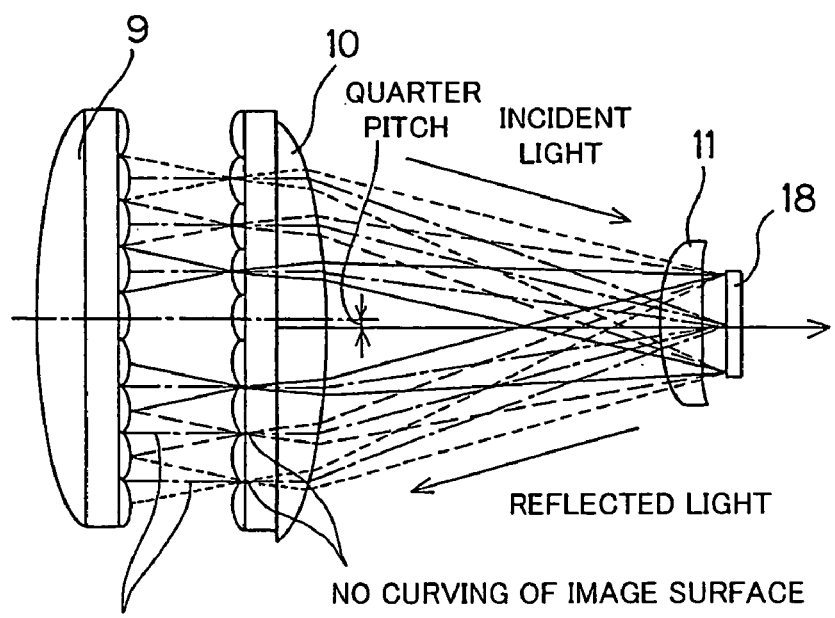
FIG. 64 also schematically illustrates the light path, showing how the aberration caused by the field lens is corrected.

On this account, a meniscus lens whose convex side is aspheric can be used as the field lens 11 as shown in FIG. 64 to correct the curvature of the image surface. The correction for aberration permits to make the light returning from the second fly-eye integrator 10 to first fly-eye integrator 9, including the rays of light far from the optical axis, parallel to the key light, whereby the efficiency of illumination light utilization can be maintained at a high level.

Note that the convex-side aspheric shape of the field lens 11 is defined by the following formula for definition of the aspheric surface:

$$Z = C \times h2/(1+\sqrt{(1-C2 \times h2)}) + A \times h4 + B \times h6$$

$$h2 = x2 + y2 : C = 1/R$$

where A, B and C are coefficients, Z is a position of the surface in optical-axial direction, h is a distance from the optical axis, x and y are Cartesian coordinate axes, and R is a radius of curvature of a basic sphere.

Note that the radius of curvature of the concave side of the meniscus lens 11 designed by the Inventors of the present invention is 121.4638 mm which will vary depending upon the design conditions such as the size of the reflection type spatial light modulating element etc.

Note that in the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

INDUSTRIAL APPLICABILITY

In the image display device according to the present invention, having been described in the foregoing, the light becoming not necessary for image display in the reflection type spatial light modulating element is returned to the light source, and guided by the reflector again to the reflection type spatial light modulating element. Thus, the illumination light can be utilized with an improved efficiency.

In this image display device according to the present invention, since the reflection type modulation selecting element and reflector are disposed in a minimum circle of confusion defined by the light emitted from the light source and converged by the spheroidal reflecting mirror to near the second focal point, so the reflection type modulation selecting element may be extremely small.

Also, in the image display device according to the present invention, the polarization splitting and synthesis can be attained inexpensively and the light made unnecessary at the reflection type spatial light modulating element can be recycled efficiently. Also, in case a single-plate reflection type spatial light modulating element is used which uses a color filter, the light can be utilized with an improved efficiency. Also in case a single-plate reflection type spatial light modulating element of a sequential color type is used, it is possible to utilize the light more efficiently. Thus, it is possible to improve the efficiency of light utilization of a reflection type spatial light modulating element of a low open area ratio and increase the peak brightness in a dark screen.

In this image display device, in case the F value of the illumination optical system is about 2.4 and the reflection type spatial light modulating element is smaller than one inch in size (diagonal), The degradation of the illumination efficiency due to the influence of the etendue is smaller than that in the P-S conversion element, whereby it is possible to improve the efficiency of polarization changing. Also, according to the present invention, the device can be constructed from a reduced number of component parts and the component parts can be mechanically positioned more precisely so that the illumination light can be reutilized with an improved efficiency.

The invention claimed is:

1. An image display device comprising:
   a spheroidal reflecting mirror having an open end;
   a light source provided at a first focal point of the spheroidal mirror;
   a polarization changing element provided at the open end of the spheroidal mirror;
   a reflection type polarization selecting element provided near a second focal point of the spheroidal mirror;
   a first fly-eye integrator upon which light having passed by the reflection type polarization selecting element is incident;
   a second fly-eye integrator upon which the light having passed by the first fly-eye integrator is incident;
   a reflection type spatial light modulating element illuminated with the light having passed by the fly-eye integrator to modulate the illumination light correspondingly to an image to be displayed;
   a light selecting element for splitting the light reflected by the reflection type spatial light modulating element into light to be returned to the second fly-eye integrator and light to be directed to a projection optical element correspondingly to the modulation by the reflection type spatial light modulating element;
   a reflector to reflect the light returned by the light selecting element to the second fly-eye integrator, to thereby direct the light back to the reflection type spatial light modulating element; and
   a projection optical system that projects the light incident via the projection optical element as image projection light,
   wherein
   the reflection type polarization selecting element and reflector being disposed inside a minimum circle of confusion defined by light emitted from the light source and condensed by the spheroidal reflecting mirror to near the second focal point.

2. The device according to claim 1, wherein the reflection type polarization selecting element and reflector are formed integrally with each other.

3. The device according to claim 1, wherein the reflection type polarization selecting element is a reflecting type circular polarizing plate and the polarization changing element is a quarter wave plate.

4. The device according to claim 1, wherein the reflection type polarization selecting element is a reflecting type circular polarizing plate and the polarization changing element is a half wave plate.

5. The device according to claim 1, wherein the reflection type spatial light modulating element is illuminated via a color selecting element that temporally splits the light from the light source into color components and the illumination light is modulated based on image information corresponding to color components selected by the color selecting element.

6. The device according to claim 5, wherein a plurality of the reflecting type spatial light modulating elements is provided, and each of them is illuminated via the color selecting element that temporally splits the light from the light source into color components and modulates the illumination light based on image information corresponding to the color components selected by the color selecting element for each of them.

7. The device according to claim 1, further comprising a relay lens through which light reflected by the reflector toward the first fly-eye integrator is passed, the first and second fly-eye integrators including fly-eye lenses equal in size to each other and disposed at a constant pitch, a central one of the plurality of fly-eye lenses being displaced a distance equal to a quarter of the fly-eye lens pitch in relation to the optical axis of the relay lens in at least one direction perpendicular to the optical axis.

8. The device according to claim 7, wherein in the first and second fly-eye integrators including the fly-eye lenses equal in size to each other and disposed at the constant pitch, the central one of the plurality of fly-eye lenses being displaced a distance equal to a quarter of the fly-eye lens pitch in relation to the optical axis of the projection optical system in at least one direction perpendicular to the optical axis; and the optical axis of the projection optical system is aligned with that of the relay lens.

9. The device according to claim 7, wherein the first and second fly-eye integrators are positioned at the contour with reference to the optical disk of the relay lens so that the central one of the plurality of fly-eye lenses is in a position displaced a distance equal to a quarter of the fly-eye lens pitch in relation to the optical axis of the relay lens in at least one direction perpendicular to the optical axis.

10. The device according to claim 9, wherein for each of the first and second fly-eye integrators, there is provided at the contour thereof a positioning portion which is a reference point for positioning.

11. The device according to claim 10, wherein further comprising:
a first lens-barrel that positions and holds the spheroidal reflecting mirror, reflection type polarization selecting element and reflector and positions the first fly-eye integrator in relation to the spheroidal reflecting mirror while positioning it by the positioning portion and holding it;
a second lens-barrel that positions and holds the spheroidal reflecting mirror, reflection type polarization selecting element and reflector and positions the second fly-eye integrator in relation to the reflection type spatial light modulating element while positioning it by the positioning portion and holding it; and
a holding member for positioning the first and second fly-eye integrators by their positioning portions, respectively, and holding them.

12. The device according to claim 10, further comprising:
a holding member for positioning and holding the first and second fly-eye integrators by their positioning portions, respectively; and
a lens-barrel for positioning and holding one of the first and second fly-eye integrators by the positioning portion of the fly-eye integrator.

\* \* \* \* \*